(12) United States Patent
Soini et al.

(10) Patent No.: US 11,657,298 B2
(45) Date of Patent: May 23, 2023

(54) CARD ENGINE FOR PRODUCING DYNAMICALLY CONFIGURED CONTENT

(71) Applicant: T-Mobile USA, Inc., Bellevue, WA (US)

(72) Inventors: Jonathan Soini, Seattle, WA (US); Tyler Axdorff, Seattle, WA (US); Senthil Kumar Mulluppadi Velusamy, Redmond, WA (US); Calum Lawler, Poulsbo, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1006 days.

(21) Appl. No.: 16/389,520

(22) Filed: Apr. 19, 2019

(65) Prior Publication Data

US 2020/0334547 A1 Oct. 22, 2020

(51) Int. Cl.
*G06N 5/025* (2023.01)
*G06F 16/22* (2019.01)
*G06F 16/906* (2019.01)
*G06F 16/35* (2019.01)
*G06F 16/28* (2019.01)
*G06F 16/901* (2019.01)

(52) U.S. Cl.
CPC ......... *G06N 5/025* (2013.01); *G06F 16/2246* (2019.01); *G06F 16/285* (2019.01); *G06F 16/35* (2019.01); *G06F 16/906* (2019.01); *G06F 16/9024* (2019.01)

(58) Field of Classification Search
CPC ........ G06N 5/025; G06N 20/00; G06N 5/003; G06N 5/022; G06F 16/2246; G06F 16/9577; G06F 16/9024; G06F 16/285; G06F 16/35; G06F 16/906

USPC .......................... 707/603, 736, 741, 769, 770
See application file for complete search history.

(56) References Cited

U.S. PATENT DOCUMENTS

| 8,090,794 | B1 | 1/2012 | Kilat et al. |
| 8,613,108 | B1 | 12/2013 | Aggarwal |
| 9,032,359 | B1 | 5/2015 | Ahmad et al. |
| 9,069,578 | B2 | 6/2015 | Singh et al. |

(Continued)

OTHER PUBLICATIONS

U.S. Appl. No. 16/389,528, Ex Parte Quayle mailed Dec. 24, 2020, 29 pages.

(Continued)

*Primary Examiner* — Phong H Nguyen
(74) *Attorney, Agent, or Firm* — Han Santos, PLLC

(57) ABSTRACT

A card engine may dynamically configure content for display via user equipment (UE). A rules engine may provide constructs to the card engine in the form of card definitions, which the card engine may evaluate using facts obtained from a facts controller. The card engine may create a hierarchy of containers, which are logical abstracts for containing cards. The containers in the hierarchy, which may be organized as a tree, may contain card definitions according to respective themes determined by the card engine. Variants may be assigned weights which can be changed dynamically based on factors such as user behavior, account condition, promotions or offerings. The card having the highest weight within its container is advanced up the tree. When a card reaches the top level of the tree, it may be formatted for display via the user interface and transmitted to the UE accordingly.

20 Claims, 19 Drawing Sheets

(56) References Cited

U.S. PATENT DOCUMENTS

| | | | |
|---|---|---|---|
| 9,410,815 | B1 | 8/2016 | Hirano et al. |
| 9,619,805 | B1 | 4/2017 | Carr et al. |
| 9,684,882 | B2 | 6/2017 | Azmoon |
| 9,817,952 | B2 | 11/2017 | Cholas et al. |
| 9,864,963 | B2 | 1/2018 | Cronin et al. |
| 9,886,565 | B2 | 2/2018 | Nielsen et al. |
| 10,032,200 | B2 | 7/2018 | Beck |
| 10,073,589 | B1 | 9/2018 | Jesensky et al. |
| 10,254,928 | B1 | 4/2019 | Jesensky et al. |
| 10,257,196 | B2 | 4/2019 | Dang et al. |
| 10,402,460 | B1 | 9/2019 | Jesensky et al. |
| 10,482,231 | B1 | 11/2019 | Harding et al. |
| 10,505,875 | B1 | 12/2019 | Jenks et al. |
| 10,536,551 | B2 | 1/2020 | Debald et al. |
| 10,599,839 | B2 | 3/2020 | Hailpern et al. |
| 10,922,640 | B2 | 2/2021 | Sarferaz |
| 11,063,927 | B1 | 7/2021 | Mukesh et al. |
| 2003/0160815 | A1* | 8/2003 | Muschetto ............ G06F 3/0481 715/733 |
| 2005/0021651 | A1* | 1/2005 | Fellenstein ............ H04L 43/08 709/228 |
| 2007/0231776 | A1* | 10/2007 | Saldutti ................ G09B 1/16 434/129 |
| 2010/0211872 | A1 | 8/2010 | Rolston et al. |
| 2010/0293385 | A1 | 11/2010 | Nanda et al. |
| 2012/0131476 | A1 | 5/2012 | Mestres et al. |
| 2012/0167185 | A1 | 6/2012 | Menezes et al. |
| 2013/0339600 | A1 | 12/2013 | Shah |
| 2014/0098102 | A1 | 4/2014 | Raffle et al. |
| 2014/0337730 | A1 | 11/2014 | King et al. |
| 2014/0359720 | A1 | 12/2014 | Wray |
| 2015/0100892 | A1 | 4/2015 | Cronin et al. |
| 2015/0100893 | A1* | 4/2015 | Cronin ................ H04L 67/535 715/751 |
| 2015/0324271 | A1 | 11/2015 | Glass et al. |
| 2016/0103805 | A1* | 4/2016 | Greenberg .......... G06F 3/04817 715/760 |
| 2016/0124934 | A1 | 5/2016 | Greenberg et al. |
| 2016/0357674 | A1 | 12/2016 | Waldspurger et al. |
| 2017/0017634 | A1 | 1/2017 | Levine et al. |
| 2017/0103327 | A1 | 4/2017 | Penilla et al. |
| 2017/0139890 | A1 | 5/2017 | Bendig et al. |
| 2017/0168777 | A1 | 6/2017 | Britt |
| 2017/0289197 | A1 | 10/2017 | Mandyam et al. |
| 2017/0346804 | A1 | 11/2017 | Beecham |
| 2018/0096024 | A1 | 4/2018 | Bitting et al. |
| 2018/0097767 | A1 | 4/2018 | Ragsdale et al. |
| 2018/0152845 | A1 | 5/2018 | Unnerstall et al. |
| 2018/0174229 | A1 | 6/2018 | Sherwin et al. |
| 2018/0308141 | A1 | 10/2018 | Beck |
| 2018/0351943 | A1 | 12/2018 | Yasukawa et al. |
| 2019/0191218 | A1 | 6/2019 | Cormican et al. |
| 2019/0312730 | A1 | 10/2019 | Engan et al. |
| 2019/0372993 | A1 | 12/2019 | Dunjic et al. |
| 2020/0045541 | A1 | 2/2020 | Kreishan |
| 2020/0143102 | A1* | 5/2020 | Ziraknejad .......... G06F 16/9038 |
| 2020/0153831 | A1 | 5/2020 | Baer et al. |
| 2020/0169549 | A1 | 5/2020 | Smith |
| 2020/0192790 | A1 | 6/2020 | Elges |
| 2020/0251111 | A1 | 8/2020 | Temkin et al. |
| 2020/0259652 | A1 | 8/2020 | Schmaltz, III et al. |
| 2020/0334151 | A1 | 10/2020 | Soini et al. |
| 2020/0334217 | A1 | 10/2020 | Soini et al. |
| 2020/0334547 | A1 | 10/2020 | Soini et al. |
| 2020/0336309 | A1 | 10/2020 | Wang et al. |
| 2020/0349060 | A1 | 11/2020 | Mestres et al. |
| 2021/0042764 | A1 | 2/2021 | Rungta et al. |
| 2021/0051098 | A1 | 2/2021 | Liu |
| 2021/0224044 | A1 | 7/2021 | Soini et al. |

OTHER PUBLICATIONS

Substantive | Definition of Substantive by Merriam-Webster. (article) [online]. Merriam-Webster.com. Archived Mar. 13, 2018. Retrieved on Feb. 17, 2021. https://www.merriam-webster.com/dictionary/substantive (Year: 2018).

U.S. Appl. No. 16/389,542, Final Office Action dated Mar. 3, 2021, 57 pages.

U.S. Appl. No. 16/749,840, Restriction Requirement dated Feb. 25, 2021, 6 pages.

U.S. Appl. No. 16/389,542, Non-Final Office Action dated Sep. 16, 2020, 46 pages.

U.S. Appl. No. 16/389,528, Corrected Notice of Allowability dated Apr. 21, 2021, 26 pages.

U.S. Appl. No. 16/389,528, Notice of Allowance dated Apr. 5, 2021, 23 pages.

U.S. Appl. No. 16/749,840, Non-Final Office Action dated May 10, 2021, 37 pages.

U.S. Appl. No. 16/389,528, Corrected Notice of Allowability dated Jul. 8, 2021, 35 pages.

U.S. Appl. No. 16/389,528, Notice of Allowance dated Jun. 16, 2021, 35 pages.

U.S. Appl. No. 16/749,840, Notice of Allowance dated Jun. 28, 2022, 71 pages.

De Vaere, Piet, "LIAM: an Architectural Framework for Decentralized IoT Networks", 2019 IEEE 16th International Conference on Mobile Ad Hoc and Sensor Systems (MASS), 12 pages. (Year: 2019).

Joohwan Park et al. "Development of a web-based user experience evaluation system for home appliances"; International Journal of Industrial Ergonomics 67 (2018) 216-228.

Nicholas Caporusso et al. "A Digital Platform for Improving Accessibility in Physical User Interfaces"; 2020 the 6th IEEE International Conference on Information Management; IEEE.

U.S. Appl. No. 16/749,817, Notice of Allowance dated Apr. 20, 2022, 34 pages.

U.S. Appl. No. 16/749,840, Notice of Allowance dated May 9, 2022, 71 pages.

U.S. Appl. No. 16/749,840, Notice of Allowance dated Jan. 31, 2022, 134 pages.

U.S. Appl. No. 16/749,852, Office Action dated Jun. 3, 2022, 72 pages.

U.S. Appl. No. 16/749,840, Final Office Action dated Oct. 7, 2021, 37 pages.

U.S. Appl. No. 16/749,817, Office Action dated Aug. 6, 2021, 29 pages.

U.S. Appl. No. 16/749,817, Final Office Action dated Dec. 16, 2021, 29 pages.

Watt, Ruaridh, "Proof-of-Possession Tokens in Microservice Architectures", MSc Computer Science Thesis, Jan. 26, 2018, pp. 1-44. (Year: 2018).

\* cited by examiner

CARD ENGINE FOR PRODUCING DYNAMICALLY CONFIGURED CONTENT

BACKGROUND

Mobile consumers demand a high degree of relevance of content presented via their smartphones and other mobile network client devices (collectively known as "user equipment" (UE)). Correspondingly, mobile network providers and their content providers demand a high degree of control in presenting content to mobile consumers.

Developers try to enable the demanded high degree of control but are hampered by the form factor of user equipment. For example, some user equipment, such as smart phones, may have a relatively small amount of screen space. User equipment also often have a relatively limited amount of physical and virtual controllers to provide user input, compared to other devices, and in many cases are limited to a touch screen. Regardless of form factor, content control involves a high degree of complexity in the editing of rules, content transforms and/or messages.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
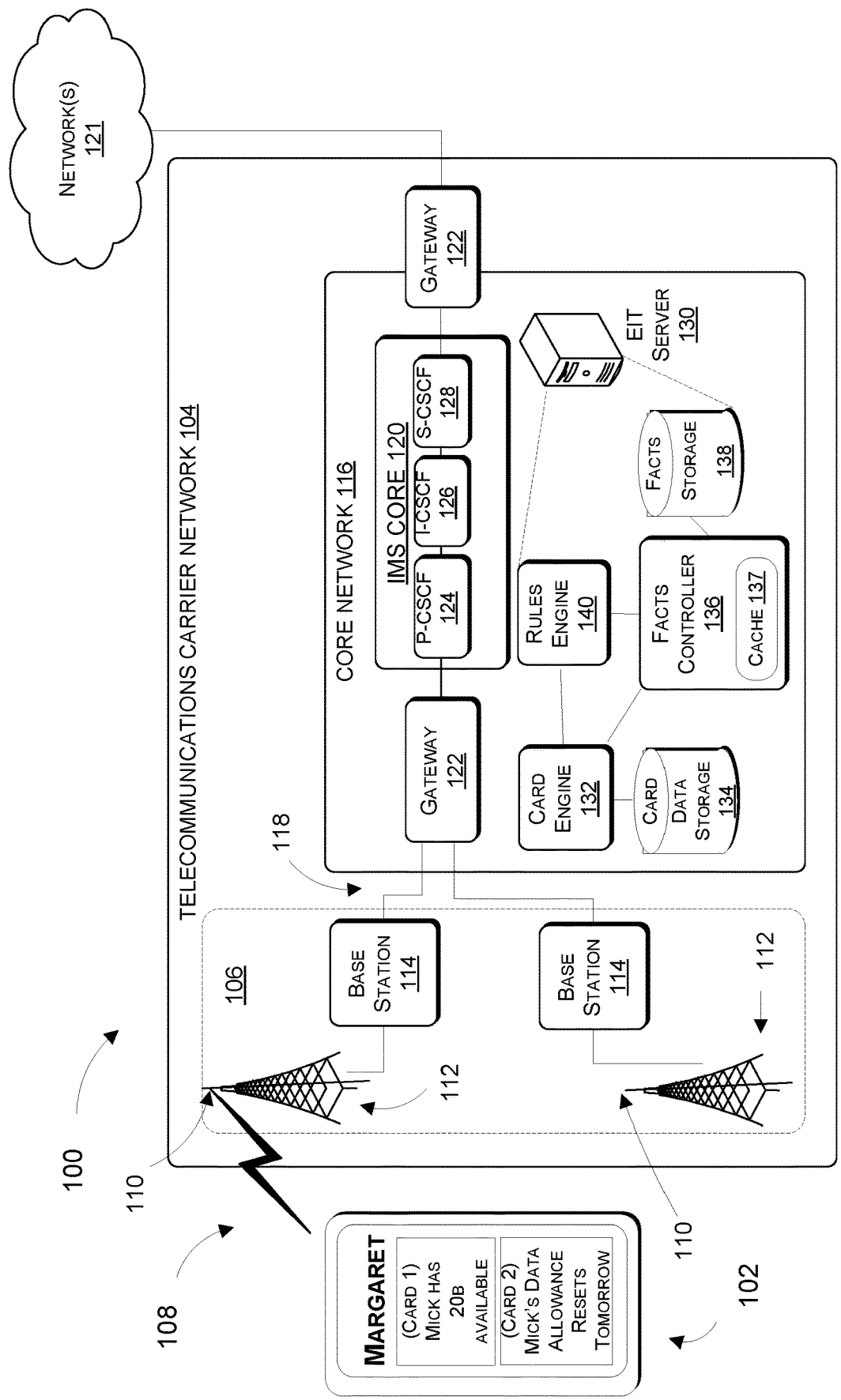
FIG. 1 illustrates an example network architecture to implement a card engine.

This disclosure is directed to one or more techniques that may dynamically configure content for display via a user interface associated with user equipment (UE). In one or more embodiments, information may be received, stored, and/or interfaced by a facts controller, which may provide the facts to a card engine and/or a rules engine. Specifically, the facts controller provides a data access layer to different data stores and data streams that the card engine may access substantively in real time. In this way, the card engine may make content decisions proximate to events occurring to the user, for example.

The card engine manages the notion of cards. Cards may contain, for example, content including data, and functionality, usually in the form of component applications, that presents the data to a user (aka "surfacing") in various formats. The selection of data to surface and in what format to display the selected data is based on logic associated with each card per a rules engine.

A rules engine may provide constructs to the card engine in the form of card definitions describing both data and functionality of a card, which the card engine may evaluate using facts obtained from the facts controller. The resulting cards may be formatted for display via the user interface and transmitted to the UE accordingly.

While cards relate to the presentation of data, data itself may be organized into groups that relate data by theme or concept. Groups of data provide an intermediate organizing element that maps data from different sources per the facts controller to one or more cards. Because cards may contain a plurality of functions in component applications, the groups may organize a mapping of data from the different sources not just to a single application, but to a set of related component applications or functions. These mappings are stored in objects called "containers." Containers are described in further detail in following sections.

Turning back to cards, in some embodiments, the card engine may create a hierarchy of containers, which are logical abstracts for containing cards. The containers in the hierarchy, which may be conceptually organized as a tree, may contain card definitions according to respective themes or concepts as determined by the card engine. The card definitions may be evaluated with facts obtained from the facts controller. Cards may have weights which can be changed dynamically based on factors such as, and without limitation, user behavior, account condition, promotions, or offerings. In some embodiments, the card having the highest weight within its container is advanced up the tree. When a card reaches the top level of the tree, it may be surfaced and transmitted to the UE in accordance with rules applied by the rules engine.

In general: "client" as used in this description may refer to a software program that requests information from the card engine; "consumer" may refer to one that receives content or services offered by a network or content provider; "customer" may refer to one having ownership responsibility of user equipment and its account, and/or access to services provided in accordance with a subscription or for other consideration; and "user" may refer to any who uses user equipment. In some instances, "consumer", "customer", and/or "user" may be used interchangeably herein without detracting from the clarity or scope of the description.

FIG. 1 illustrates an example network architecture 100 to implement a card engine. The network architecture 100 may include a UE 102 and a telecommunications carrier network 104. The UE 102 may be a smartphone, a smartwatch, a tablet computer, a phablet computer, or any other computing device that is capable of communicating with other devices via the telecommunications carrier network 104. In one or more embodiments, the telecommunications carrier network 104 may be a cellular network, and may provide telecommunication and data communication in accordance with one or more technical standards, such as 2G/2.5G technologies such as Enhanced Data Rates for GSM Evolution (EDGE), 3G technologies such as Wideband Code Division Multiple Access (W-CDMA) and CDMA-2000 (Code Division Multiple Access 2000), 4G technologies such as High Speed Packet Access (HSPA) and Long Term Evolution (LTE), and 5th Generation (5G) wireless systems such as 5G NR, and/or so forth.

The UE 102 may first access the telecommunications carrier network 104 through a radio access network 106 via a wireless connection 108. The wireless connection 108 may include cellular division multiple access (CDMA), time division multiple access (TDMA), frequency division multiple access (FDMA) and future iterations of cellular division, time division and frequency division wireless communications techniques. Examples include orthogonal frequency division multiple access techniques used in current versions of the wireless connection 108.

In some embodiments, the network side of the wireless connection 108 may terminate with one or more antennas 110 on, e.g., respective cell towers 112 in the case of a cellular network. The antennas 110 may feed to one or more base stations 114, which then may access a core network 116 over a wired connection 118 known as a backhaul. The backhaul 118 is often comprised of fiber optic communications cables, although no limitation should be inferred. A portion of the telecommunications carrier network 104 that includes the antenna(s) 110, cell tower(s) 112, and base station(s) 114 may transfer signals from the UE 102 to the core network 116, i.e. providing access to the core network. Therefore, this portion of the telecommunications carrier network 104 is sometimes called the access network.

In 4G and later embodiments, the core network 116 may include an IP Multimedia Subsystem (IMS) core 120. The IMS core 120 may be accessed via one or more gateways 122 and related components that are tasked with providing connectivity between the telecommunications carrier network 104 and UEs, including the UE 102, by acting as a point of entry and exit for data traffic. In turn, the IMS core 120 may provide the UEs with data access to external packet data networks 121, such as the networks of other telecommunications carrier networks or the Internet.

The IMS core 120 may include a Proxy Call Session Control Function (P-CSCF) 124 or an equivalent function. The P-CSCF 124 may route incoming Session Initiation Protocol (SIP) messages to an IMS registrar server. The P-CSCF 124 may also safeguard the security of the IMS core 120 by handling Internet Protocol Security (IPSec) for communications that are exchanged with user devices. In some alternative instances, instead of SIP sessions, the P-CSCF 124 may handle Remote Authentication Dial-In User Service (RADIUS) sessions. The P-CSCF 124 may interact with an Interrogating CSCF (I-CSCF) 126 and a Serving CSCF (S-CSCF) 128. In some instances, the I-CSCF 126 may be an inbound SIP proxy server of the IMS core 120. During IMS registration of a UE, the I-CSCF 126 may query a home subscriber server (HSS) to designate an S-CSCF 128 to service the UE 102. The I-CSCF 126 may be further responsible for routing incoming IMS session requests and terminating IMS sessions requests.

The core network 116 is the portion of the telecommunications carrier network 104 where routing, billing, policy implementation and other communications services may be implemented by, for example, a Policy and Charging Rules Function (PCRF) or another equivalent rules engine and/or billing function. For example, a billing function may enable the telecommunications carrier network 104 to monitor services, such as data, voice, text, etc., that are used by subscribers of the telecommunications carrier network 104 and charge the subscribers and/or other parties in real-time based on service usage. In various embodiments, the billing function may be an Online Charging System (OCS) or another equivalent core network component of the telecommunications carrier network 104.

The core network 116 may include one or more application servers, including without limitation an enterprise information technology (EIT) server 130, to implement application servers and host a card engine 132 coupled to a card data storage 134, a facts controller 136 coupled to a facts storage 138, and a rules engine 140. In one or more embodiments, the card engine 132 and/or rules engine 140 may also be coupled to the facts storage 138.

The card engine 132 may collect data from the facts controller 136 into conceptual or thematic groups, receive containers and card definitions from the rules engine 140, and evaluate the card definitions to produce content for cards that may be presented to a user via a user interface of the UE 102.

The facts controller 136 may gather and store facts associated with every experience or user engagement on the UE 102 and through the telecommunications carrier network 104. For example, the facts controller 136 may collect, from other systems, for example from cards or other user telemetry sensors, user behaviors, usage data, and system information for use by the card engine 132 and the rules engine 140 in determining what cards to surface and when. In this sense, the facts controller 136 offers a "shared fact service"

for the benefit of the card engine 132, the rules engine 140, and other engines and purposes consistent with its function.

Facts gathered by the facts controller 136 may include unique facts (e.g., customer-specific facts such as, and without limitation, current data plan usage, customer identifier, and/or device type) or non-unique facts (e.g., customer-nonspecific facts such as, and without limitation, events such as adding a new line, ordering a new cellphone, or exceeding a usage threshold). Both types of data may be used by the card engine 132 to evaluate cards or by the rules engine 140 to direct communications such as alerts, actionable messaging, and/or dashboards to, e.g., a customer, a care representative, or a sales representative.

Facts may be "parent" facts that include subfacts relating to the parent fact (e.g., relating to the value of the parent fact in a name-value pair) and inherit metadata of the parent fact. Facts and subfacts may be provided at the same time, to the facts controller 136 or by the facts controller 136 in response to a request. In some examples, the facts controller 136 may be configured to gather fact metadata from sources such as various enterprise servers and trusted third party servers.

The facts controller 136 may cache facts in a facts cache 137 in accordance with a caching policy e.g., to improve computational efficiency of the card engine 132 and the rules engine 140. Cached facts further ensure that these and other engines (e.g., a workflow engine) may provide a common experience based on a common fact schema, discussed below.

While facts may be cached to improve computational efficiency, blacklisting and whitelisting relating to fact data may ensure an accuracy of underlying cached facts. Whitelists and blacklists may be defined, for example, by a service representative, a consumer, or an administrator of the telecommunications service provider. Alternatively or in addition, the cache may be bypassed if set in the request.

The facts controller 136 may decouple or delete fact data in the cache 137 based on an expiration date associated with a fact or subfact. Facts may have a minimum set of data: primary key (i.e. device identifier), key, value, type (unique or non-unique), timestamp, expiration, sensitivity (i.e. unrestricted, restricted, confidential), and source. In some embodiments, the device identifier may correspond to an aggregated user identifier managed by a communications carrier, such as T-Mobile ID™. Specifically, a communications carrier may manage identifier requests by mapping one or more devices, cellular or WIFI or otherwise to a user identifier specific to the carrier, in a supplementary table communicative with a Home Location Register or a Home Subscriber Service, or other carrier user database.

Commonly, non-unique facts have an expiration date, and once the expiration data has passed, the fact may decouple. Further since subfacts inherit the metadata associated with a parent fact, an expiration of the parent fact can cause the related subfacts to decouple. Facts may also be decoupled based on a change in sensitivity. For example, the rules engine may dictate the sensitivity of facts that may be stored by the facts controller. If the sensitivity of a stored fact changes, the fact may be decoupled.

Facts controller may store deposited facts and cached facts that have been cached during a gather call. To ensure accuracy of facts, deposited facts have a higher precedence. Thus, the facts controller may decouple cached facts that are associated with a gather call in response to receiving a similar deposited fact.

In one example, a card engine may request a fact associated with the consumer. For the sake of efficiency, if response times to gather the facts exceed a threshold, the facts controller may deliver known facts until that point. If the requested fact is not a known fact, the card engine may omit the card from presentation to the consumer.

In some embodiments, some or all facts may be offered by the client in the request to specify return of cards that contain such facts. In instances in which fewer than all facts are included in the request (a "partial facts" request), the card engine 132 should still gather facts to complete the response. In instances in which all facts are included in the request (a "complete facts" request), the card engine 132 should not gather additional facts when evaluating the request.

The rules engine 140 may determine what cards to surface, to which UE 102, and when based on predetermined rules and/or dynamically generated rules. The rules engine 140 may develop and deploy business logic used by the card engine 132 to evaluate a container, for example. The rules engine 132 may use machine learning algorithms and facts data obtained from the facts controller 136 to dynamically configure a presentation style of cards based on known user preferences and other factors.

Figure 2:
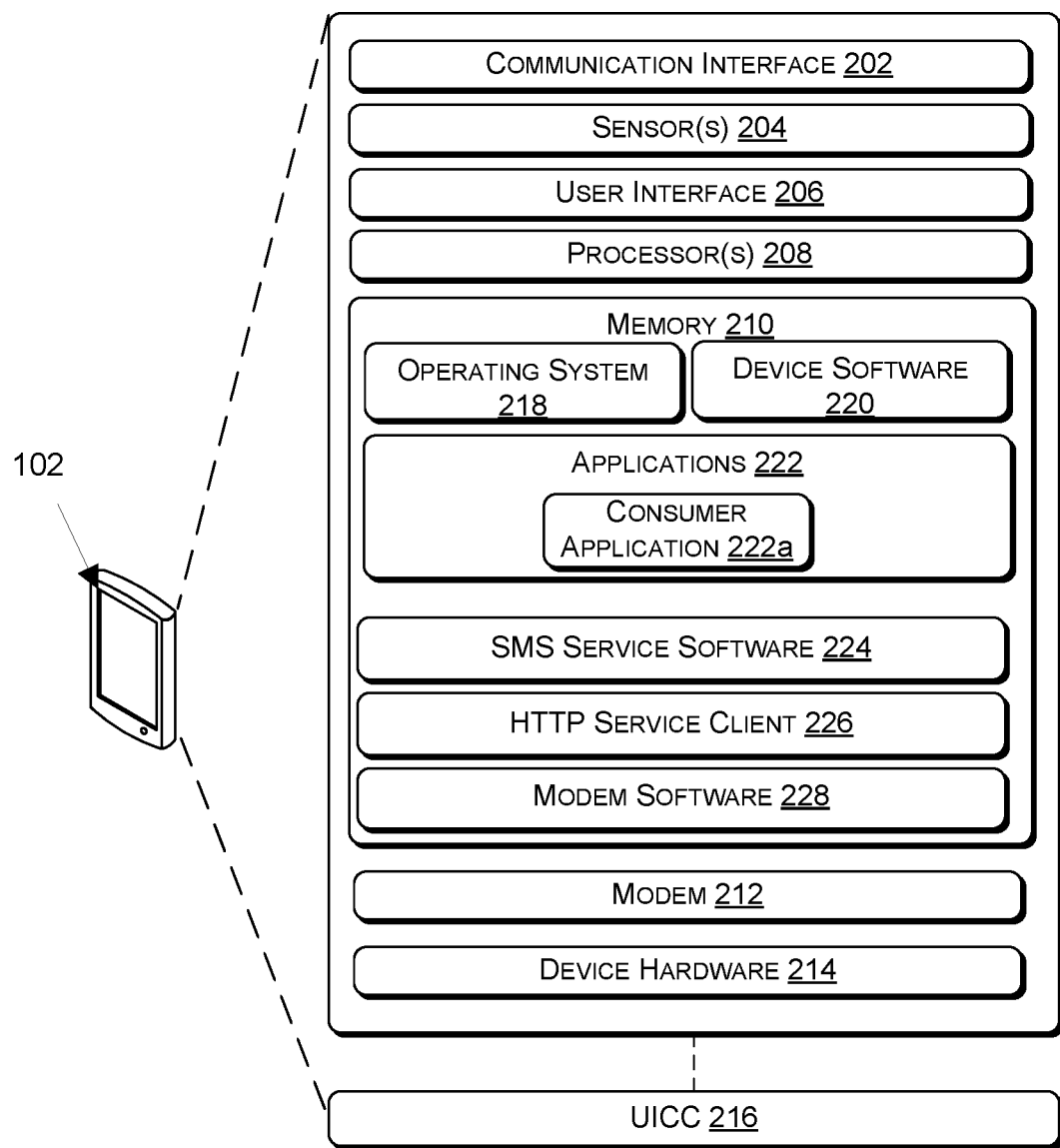
FIG. 2 is a block diagram showing various components of an illustrative user equipment (UE).

FIG. 2 is a block diagram showing various components of an illustrative UE 102. The UE 102 may include a communication interface 202, one or more sensors 204, a user interface 206, one or more processors 208, and memory 210. The communication interface 202 may include wireless and/or wired communication components that enable the electronic device to transmit or receive voice or data communication via the radio access network 106, as well as other telecommunication and/or data communication networks. The sensors 204 may include a proximity sensor, a compass, an accelerometer, an altimeter, and/or a global positioning system (GPS) sensor. The proximity sensor may detect movement of objects that are proximate the UE 102. The compass, the accelerometer, and the GPS sensor may detect orientation, movement, and geolocation of the UE 102.

The user interface 206 may enable a user to provide input and receive output from the UE 102, including for example providing one or more input to initiate device activation. The user interface 206 may include a data output device (e.g., visual display, audio speakers), and one or more data input devices. The data input devices may include, but are not limited to, combinations of one or more of touch screens, physical buttons, cameras, fingerprint readers, keypads, keyboards, mouse devices, microphones, speech recognition packages, and any other suitable devices or other electronic/software selection methods.

The memory 210 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media include, but are not limited to, RAM, ROM, EEPROM, flash memory or other memory technology, digital optical disks including CD-ROM, Digital Versatile Disk (DVD), Blu-Ray or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The UE 102 may also include a modem 212 and other device hardware 214. The modem 212 is a hardware component that enables the UE 102 to perform telecommunication and data communication with the radio access network 106. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot), and/or the like that enables the UE 102 to execute applications and provide telecommunication and data communication functions. The UICC 216 may be an integrated circuit chip that is inserted into the UICC slot of the UE 102, or an embedded UICC (eUICC) that is hardwired into the circuit board of the UE 102.

The one or more processors 208 and the memory 210 of the UE 102 may implement an operating system 218, device software 220, one or more applications 222 (including an application 222a), SMS service software 224, a HTTP service client 226, and modem software 228. The one or more applications 222 may include a consumer application 222a. The various software and applications may include routines, program instructions, objects, and/or data structures that perform particular tasks or implement particular abstract data types. The operating system 218 may include components that enable the UE 102 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment, such as a Java Virtual Machine or Microsoft's Common Language Runtime™, for the execution of the applications 222. The operating system 218 may include a presentation component that presents the output (e.g., displays the data on an electronic display, stores the data in memory, transmits the data to another electronic device, etc.).

The operating system 218 may include an interface layer that enables applications to interface with the modem 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the UE 102 to perform functions. For example, the device software 220 may include basic input/output system (BIOS), Boot ROM, or a bootloader that boots up the UE 102 and executes the operating system 218 following power up of the device.

The applications 222 may include applications that provide utility, entertainment, and/or productivity functionalities to a user of the UE 102. For example, the applications 222 may include telephony applications, electronic mail applications, remote desktop applications, web browser applications, navigation applications, office productivity applications, multimedia streaming applications, and/or so forth.

The SMS service software 224 may provide the UE 102 with the ability to send and receive SMS messages from a Short Message Service Center (SMSC), such as an SMS server that resides on the radio access network 106. In various embodiments, the transmission of messages between the SMSC and the SMS service software 224 may be performed according to the Mobile Application Part (MAP) of the Signaling System 7 (SS7) protocol, or alternatively via an application layer on top of a TCP/IP stack. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 224 and the SMSC may be encrypted and decrypted by both parties according to the SCP80 OTA secure channel protocol, or another equivalent secure SMS communication protocol.

The HTTP service client 226 may enable the UE 102 to establish a communication session with a server, such as a web server or a file service, using HTTP. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226 may submit an HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol such as, the Transport Layer Security (TLS) protocol.

The modem software 228 may drive the modem 212 to perform telecommunication and data communication with the radio access network 106. The modem software 228 may be firmware that is stored in dedicated non-volatile memory of the UE 102. Such non-volatile memory may include read-only memory (ROM), erasable programmable read-only memory (EPROM), or flash memory.

Figure 3:
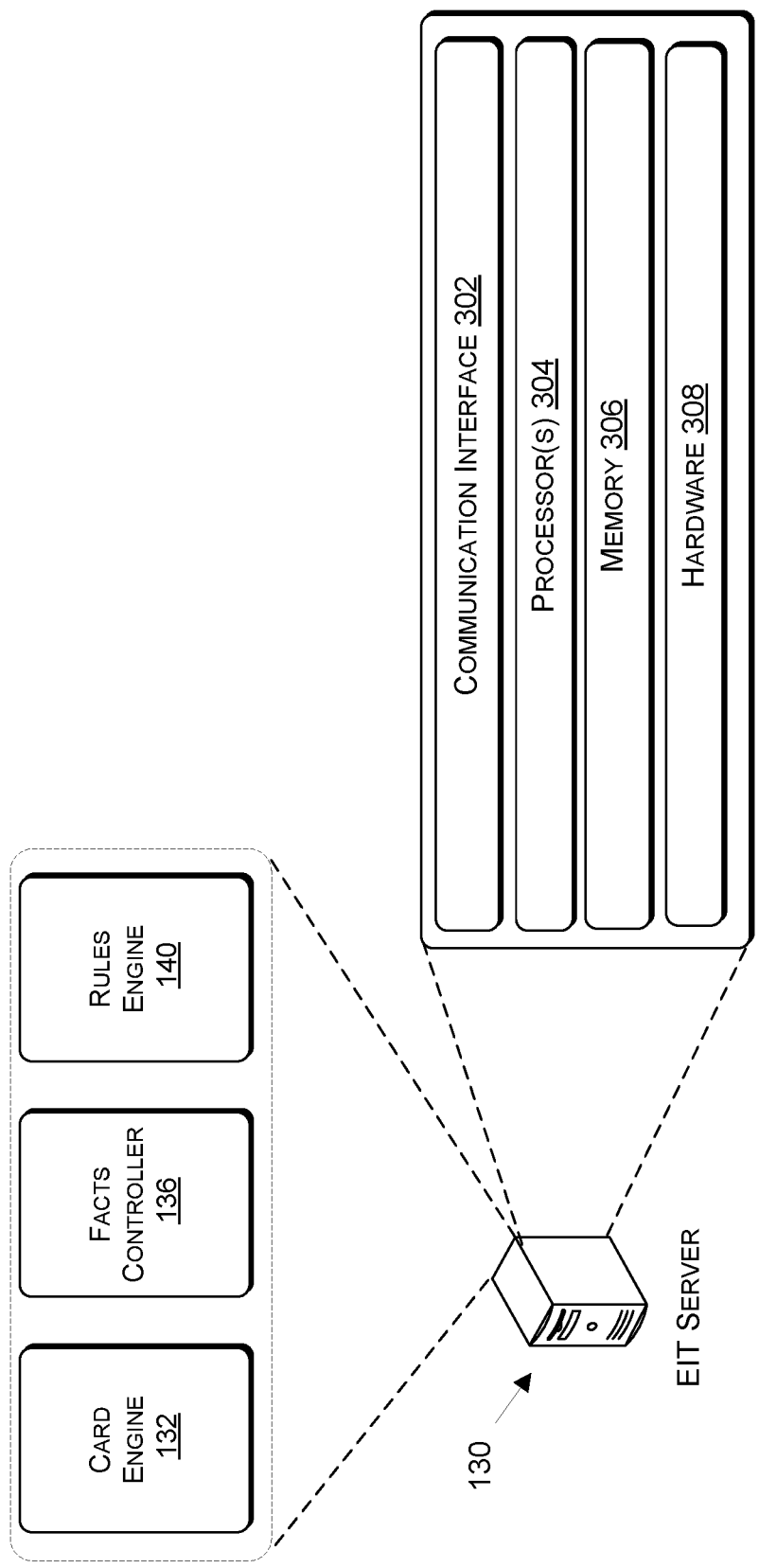
FIG. 3 is a block diagram showing an example of various components of an EIT server that support the core network for implementing the card engine, the facts controller, and the rules engine.

FIG. 3 is a block diagram showing an example of various components of the EIT server 130 that supports the core network 116 for implementing the card engine 132, the facts controller 136, and the rules engine 140. The EIT server 130 is in many respects analogous to the UE 102 and thus may include a communication interface 302, one or more processors 304, memory 306, and hardware 308. The communication interface 302 may include wireless and/or wired communication components that enable the EIT server 130 to transmit data to and receive data from other networked devices such as the card data storage 134 and the facts storage 138. The one or more processors 304 may control various functions of the EIT server 130 and implement an operating system, the card engine 132, the facts controller 136, and the rules engine 140. The memory 306 may store the operating system and applications comprised of software components. The hardware 308 may include additional user interface, data communication, or data storage hardware.

The card engine 132 may generate a hierarchy of containers in the form of a tree in one or more embodiments. A container may contain one or more cards and/or one or more other containers.

A card is a card definition after evaluation (resolution). "Evaluation" may be considered a process by which a UE 102 requests cards from the card engine 132, which formats the card with facts obtained from the facts controller. Thus, a card is a representation of data that is formatted into content which is then presented per the user interface items and logic of a card (a "surfacing") via the application 222a and user interface 206 and thus "ready for consumption" via the UE 102.

The following is one, non-limiting example of a card definition suited for one or more embodiments described herein:

```
{
  "@class": "corn.card.schema.internal.card.CardDefinition",
  "id": "my_card",
  "display_from": "2017-10-01T18:25:43.511Z",
  "display_until": "2018-10-31T18:25:43.511Z",
  "eligibility_condition": "true",
  "type": "PROMO",
  "tags":
    "phone_campaignxyz",
    "app_another_tag"
  ],
  "related_ids": {
    "id_token": "someguidhere",
    "app_token": "someguidhere",
    "another_id_for_correlation": "someguidhere"
  },
  "metadata": {
    "author": "authorname",
    "source": "source system",
    "point_of_contact": "name here",
    "docs_url": "http://dev.com/somestoryurl",
    "notes": "explanatory note"
  },
  "variants": ]
    {
      "id": "example_variant",
      "audiences": [
        "mynw"
      ],
      "weight": 100,
      "ctas": [
        {
          "id": "buy_new_phone",
          "meta": {
            "author": "authorname",
            "notes": "explanatory note"
          },
          "audiences": [
            "app",
            "mynw"
          ],
          "content": {
            "en-US": {
              "default_url": "https://www.myurl.com",
              "cta_payload": {
                "element": "Hello #{customerName}#!"
              },
              "dynamic_url": "https://www.myurl.com/#{sessionName.token}#?customerName=#customer.name}#"
            },
            "es-US": {
              "default_url": "https://www.myurl-spanish.com",
              "dynamic_url": "https://www.myurlspanish.com/#{sessionName.token}#customerName=#{customer.name}#"
            }
          }
        }
      ],
      "trigger_condition": "$customerAddress.zip == '12345'",
      "template_id": "two_label_no_cta",
      "background_image": "https://imgur.com/diving_into_gold.pnb",
      "background_color": "#FFFFFFFF",
      "payload": {
        "en-US": {
          "cta_text": [
            {
              "value": [
                "Yes!",
                "$1000",
                "for my new Phone!"
              ],
              "style": [
                {},
                {
                  "size": 20,
                  "color": "#000000FF",
                  "font": "ComicSans",
                  "gravity": "top"
                },
                {}
```
```
              ]
            }
          ],
          "content_elements": [{
            "title": {
              "value": [
                "Hey #{customer.firstname}#",
                "A Brand New Phone"
              ]
            },
            "subtitle": {
              "value": [
                "Buy this new",
                "tech wonder!",
              ],
              "style": [
                {},
                {
                  "size": 20,
                  "color": "#000000FF",
                  "font": "ComicSans",
                  "gravity": "top"
                },
                {}
              ]
            }
          }]
        },
        "es-US": {
          "cta_text": [
            {
              "value": [
                "diablos",
                "si",
                "¡nuevo teléfono!"
              ],
              "style": [
                {},
                {
                  "size": 20,
                  "color": "000000FF",
                  "font": "ComicSans",
                  "gravity": "top"
                },
                {}
              ]
            }
          ],
          "content_elements": [{
            "title": {
              "value": [
                "Hey #{customer.firstname}#",
                "Un nuevo Phone"
              ]
            },
            "subtitle": {
              "value": [
                "¡Compre esto nuevo",
                "cosa brillante",
                "de nosotros!"
              ],
              "style": [
                {},
                {
                  "size": 20,
                  "color": "#000000FF",
                  "font": "ComicSans",
                  "gravity": "top"
                },
                {}
              ]
            },
            "caption": {
              "value": [
                "This is a picture"
              ]
            }
          }]
        }
```

-continued

```
      }
    }
  ]
}
```

Card definitions may be generated by the rules engine 140 of unique facts and non-unique facts that may be obtained from the facts controller 136. The number of facts available to the various engines and developers is not limited and may include placement and visibility on the user interface 206, marketing content (e.g., headlines, greetings, descriptions), imagery (static and dynamic), facts about the customer (including facts about the customer plan or device), offer details, CTAs, time of day, device location, eligibility for an offer or promotion (based on, e.g., time/date windows, device and operating system eligibility, plan type, customer account information, and/or account status), channel, and language. Some facts may be stored in a dictionary maintained by the facts controller 136.

The following is one, non-limiting example of a simple, unique fact that might be stored in the dictionary. Facts may originate from a database creator, a client, a user, a third-party, or otherwise:

```
{
  "key": "device_make",
  "type": "fact",
  "value": "Phone Maker",
  "timestamp": "2017-05-22T23:3:01-08:00",
  "source": "exchange",
  "sensitivity": "unrestricted",
  "expires": "2017-05-31T00:00:01-08:00"
}
```

The following is one, non-limiting example of a unique fact having subfacts that might be stored in the dictionary:

```
{
"key": "user_name",
"type": "fact",
"value": "Will Crowther",
"timestamp": "2017-05-22T23:32:01-08:00",
"source": "d3",
"expires": "2017-05-31T00:00:01-08:00",
"subfacts": {
   "firstname": "Will",
   "lastname": "Crowther",
   "title": "Captain",
     "nickname": "Hotdog"
   }
}
```

The following is one, non-limiting example of a non-unique fact (an event) having subfacts that might be stored in the dictionary:

```
}
"key": "customer_orderstatus",
"type": "event",
"value": "5042501EN",
"timestamp": "2017-05-22T23:32:01-08:00",
"source": "tom",
"expires": "2017-05-31T00:00:01-08:00",
"subfacts": {
   "reference": "5042501EN",
   "courier"; "Courier",
   "tracking_no": "1111111111",
```

```
   "shipped": true,
   "shipped_on": "2017-05-22T20:58:07-08:00",
   "shipped_type"; "Overnight Express",
   "view_url": "https://shipper.com/vieworderstatus/"
   }
}
```

Referring back to the example card definition described above, the following is one, non-limiting example of facts suited for evaluating the card definition:
("customerAddress.zip", "12345"),
("customer.firstname", "Adam")
("sessionName.token", "someToken")
("customerName", "Adam")
The evaluated card may be:

```
{
"card_id": "my_card",
"template_id": "two_label_no_cta",
"variant_id": "example_variant",
"type": "PROMO",
"display_from": "2017-10-01T18:25:43.511Z",
"display_until": "2018-10-31T18:25:43.511Z",
"ctas": [{
   "cta_id": "buy_new_phone",
   "url": "https://www.myurl.com/someToken?customerName=Adam"
}],
"payload": {
   "content_elements": [{
      "title": {
         "value": ["Hey Adam", "A Brand New Phone"]
      },
      "subtitle": {
         "value": ["Buy this new", "tech wonder"]
         "style": [{}, {
         "size": 20,
         "color": "#000000FF",
         "font": "ComicSans",
         "gravity": "top"
         }, {}]
      }
   }]
}
}
```

In some embodiments, messages may be presented via a card or cards and facts may be included into the messages. One technique that may be used is to specify the fact name surrounded by #{ }#. For example and without limitation:
This in an example to show that my name is #{facts.name}#.

In some embodiments, the format for the fact may be specified in the message. For example and without limitation, given the following facts relating to a particular film, a message may be constructed as shown below:

```
"facts": {
  "film.name": {
    "value": "Casablanca",
    "timestamp": "2016-12-02T07:32:01.000+0000",
    "source": "filmbase"
  },
  "film.size": {
    "value": 2100000000,
    "timestamp": "2016-12-02T07:32:01.000+0000",
    "source": "filmstorehouse"
  },
  "film.ticket.price": {
    "value": 9.1,
    "timestamp": "2016-12-02T07:32:01.000+0000",
```

-continued

```
    "source": "MPAA"
  },
  "film.offer.day.remain": {
    "value": 14,
    "timestamp": "2016-12-02T07:32:01.000+0000",
    "source": "Offers"
  },
  "film.offer.other.customers": {
    "value": 1,
    "timestamp": "2016-12-02T07:32:01.000+0000",
    "source": "D3"
  },
}
```

In this example, these messages:
Do you want to use #{film.size:{f:'fmt.data',a:['GB']}}# of your available storage for this film?
The price is #{film.ticket.price:{f:'fmt.currency'}}# for this film.
This offer is available for another #{film.offer.day.remain: {f:'fmt.plural',a:['day','days']}}#.
{film.offer.other.customers: {f:'fmt.plural', a:['other customer has','other customers have']}}# taken advantage of this exciting offer!
may be resolved to:
Do you want to use 2.1 GB of your available storage for this film?
The price is $9.10 for this film.
This offer is available for another 14 days.
1 other customer has taken advantage of this exciting offer!

Examples consistent with the above may use a syntax illustrative of a lightweight JSON variant that uses no quote marks for keys but single quotes for (string) values. No limitation on the syntax is meant or should be inferred:

```
#{film.size: {f:'fmt.data',a:['GB']}}#
or
  #{
    film.size:{
      f: 'fmt.plural'   // The name of the fact to evaluate the value of
      a: [              // [Optional] The identifier of the formatter to use.
    formatter.           // [Optional] A list of arguments to pass to the
       'GB'
      ]
    }
  }#
```

Message formatting rules are enforced. In the above example, 'fmt.plural' identifies the formatter to use for the fact film.size. Some examples of message formatters are shown in the following table. All entries are for illustration purposes only; not all types, identifiers, etc. are necessary for implementation and others may be used or substituted:

| Type | Identifier | Arguments | Effect |
|---|---|---|---|
| data | fmt.data | data output unit (String), data input unit (String), round digits (int), show unit (boolean) | May be an integer, representing a number of bytes. Arguments are optional. |
| currency | fmt.currency | | May be an integer or floating point number. May trim/pad to two decimal places and add a dollar sign to the start of the value |
| plural | fmt.plural | suffix if singular, suffix if plural | May be an integer. May append the integer with a space and then one of the two given strings depending on whether the integer is one or greater |
| bool | fmt. bool | string if true, string if false | May be a boolean value. May replace the placeholder with one of the two given strings depending on whether the value is true or false. |
| date | fmt.date | java dateformat string | May be a ISO 8601 date. May reformat that date to the given Java DateFormat string. If no time zone is specified, a default time zone may be used |
| tocase | fmt.tocase | string (enum) | May be a string. Applies casing format. Single argument is effectively enum that determines case. Choice of: 'upper' - All letters capitalized, 'lower' - All letters lowercase, 'sentence' - First letter capitalized, 'title' - First letter of every word capitalized |
| phonenumber | fmt.phonenumber | | May be a string, representing a phone number. May convert 10 digit phone number with spaces, dashes, etc. to form (555) 555-5555 and convert 7 digit phone number format to form 555-5555. |
| integer | fmt.tointeger | | May be a Float/Double value and convert the Float/Double value to an integer. |

The following examples may be understood in accordance with the foregoing table:

| Template | Fact Value | Output |
|---|---|---|
| #{fact:{f:'fmt.data'}}# | 5000000 | 4.77 MB |
| #{fact:{f:'fmt.data',a:['MB','B',0,true]}}# | 5000000 | 5 MB |
| #{fact:{f:'fmt.data',a:['MB','B',2,false]}}# | 5000000 | 4.77 |
| #{fact:{f:'fmt.currency'}}# | 12.45 | $12.54 |
| #{fact:{f:'fmt.plural',a:['pint','pints']}}# | 1 | 1 pint |
| #{fact:{f:'fmt.plural',a:['pint','pints']}}# | 2 | 2 pints |
| #{sentenceFact:{f:'fmt.tocase',a:['title']}}# | this is a title | This Is A Title |
| #{fact:{f:'fmt.phonenumber'}}# | 5555555555 | (555) 555-5555 |
| #{fact:{f:'fmt.tointeger'}}# | 36.45 | 36 |

If a fact key does not resolve to an available fact, the card variant will be skipped and not returned.

Components of a card definition may include one or more variants, conditional statements, and/or metadata related to facts. One card may have multiple variants. A card also may have zero variants, but such a card will not be returned in response to a card request. A variant may be keyed to a card identifier and represent a dynamic variable in a surfaced card and characteristic of the user experience, associated with a fact, brought by the card when presented. Variants may capture unique facts associated with a user in general to be presented via a card (e.g., customer name, device type, data allowance, remaining data allocation, etc.) and/or non-unique facts associated with the user at a given point in time (i.e. time of day, day of the week, location, etc.), and be dependent on a trigger condition that determines whether the variant can be returned. In some embodiments, a variant may contain content based on geolocation (e.g., current location of the user). A variant also may be linked to one or more CTAs (Calls To Action). The rules engine 140 may analyze variants of cards and assign weight values that affect or control whether a card is presented to a consumer in some embodiments described herein.

Conditional statements may determine whether a card or container can be returned. Conditional statements are intended in general to contain logic which evaluates to determine a card's validity for surfacing. For example, and without limitation, an appropriately written conditional statement may prevent a card from surfacing if the user is current on her account and has an iOS device. As another example, a conditional statement may permit the presentation of a promo card only for a specified period.

Fact metadata may include one or more of a primary key (i.e. device identifier), key, value, type (unique (e.g., fact) or non-unique (e.g., event)), timestamp, expiration, sensitivity (i.e. unrestricted, restricted, confidential), and source. In some embodiments, a minimum set of metadata, such as primary key, key, value, type, timestamp, and source may be sufficient. In addition to its role in gathering and retrieving facts, this information may be used by the facts controller 136 to decide whether to cache a fact and for how long, or to optimize the gathering of facts by selecting services to call, thus reducing latency and load on downstream services.

Cards may have subcards that individually relate to a higher-level card of the tree. Subcards are essentially cards that belong to other cards, and therefore subcards may be referred to as "cards" herein. There may be one or more subcards that are grouped according to a theme or concept. Examples of subcard groupings may include consumer name and category description of underlying data, such as "promotions" (e.g., a top-level card may be an individual promotional offering). In some embodiments, subcards may access the cache 137 in the facts controller 136 to personalize a card by adding "known" consumer facts (i.e., facts about the consumer or other consumers that have been added previously to the facts controller 136). Subcard definitions can be dynamically updated based on iterated content (e.g., fact data from the facts controller 136 updated in real-time or based on prior customer selections to access or ignore previous cards within the same (or different) container).

Weight values assigned to variants and imputed to cards and/or containers may contribute to determining whether and/or when a card will surface. For example, the card engine 132 may prioritize presentation of a card from a container to a UE 102 based on one or more of weighted values and/or rules such as location, time of day, day of the week, context of operation, or any other standardized or consumer-specific rule.

In some embodiments, the card engine 132 may select the highest weighted card from child container(s) in a parent container for surfacing. A weight value may be based on machine learning (ML) or cognitive network (CN) algorithms that analyze customer selections or based on correlations within a client model of similar consumers.

Variants may have a single weight value—a larger value may indicate higher weight. In some embodiments, weight may be mandatory for a variant. When a card definition is evaluated, the weighted values of the card's variants may change the value of the card itself. Evaluated cards from the bottom of the tree rotate up toward the top of the tree, in order of their weights in some embodiments. An example is described below. The evaluated cards may be surfaced from the top of the tree.

In accordance with the card engine 132 assessing the cards and variants for presentation in response to a request for cards, the card engine 132 may assess variants for possible cards in the order in which they are listed within the card, selecting the first variant that is possible to display. Once a variant has been selected, the card may acquire the weight of the variant. To select one card from a group, the card engine 132 may choose the highest weighted of the available cards to surface from its container before a card in the same container having a lower weight.

Containers optionally may be configured for the card engine 132 to sort the cards under them by weight. The response to a request for a group of cards may be in the final order of cards with no subsequent sorting. In this way, other systems as needed can replicate what has been presented.

Some containers (e.g., carousel containers) may not be made transparent to the client, but their cards may still have weight values. In this sense, one may refer to the container as having weight. Weight may be mandatory for such containers. For example, in a carousel container that has a parent container that is sorted, the placement of the carousel container may be based on its own weight. Nevertheless, the content of the carousel container may be sorted (or not) based on whether the carousel container is configured to sort and on the weights of the selected variants within it.

The card engine 132 may request a fact associated with the consumer from the facts controller 136. Typically the facts controller will check the cache 137 for presence of the requested facts before searching the facts storage 138 or another source from which to gather the facts. For the sake of efficiency, if response times to gather the requested facts exceed a threshold, the facts controller 136 may deliver known facts until that point. If a requested fact is not a known fact, the card engine 132 may omit the card from surfacing. If a card or subcard is missing an array fact (discussed below) at the time that card or subcard is to be presented, then that card or subcard is skipped and not presented.

Containers offer a way of querying and serving content to the application 222a. For example, the logical grouping and content collection by the card engine 132 uses the concept of containers to an end of building more flexible experiences and better serving mobile users.

There are different types of containers that are generated to hold cards of different conceptual or thematic groups. Examples of containers may include, but are not limited to, array containers, tag containers, carousel/list containers, basic containers, named group containers, recipe containers, A/B containers, and type containers. Different types of containers may have different effects when resolved.

Containers may be created by evaluating container definitions that may be generated by the rules engine 140. A container definition may be considered as an abstraction that represents a logical grouping of cards. The logical grouping of cards may be content-based or based on the type of container. For example, a container definition may include a top-level card ("furniture card") that identifies a grouping of subcards. In some embodiments, the grouping may be performed by the card engine 132 by tag, type, etc. Card definitions resolve to cards and subcards resolve to subcards when evaluated by the card engine 132. Similarly, a container definition resolves to a container, which may occur at card evaluation.

The container hierarchy tree may be evaluated recursively, with a container passing up to its parent zero or more cards that occur during its resolution. The evaluated cards passed up from the root of the tree may be surfaced from the top of the tree for display via the user interface 206.

Figure 4:
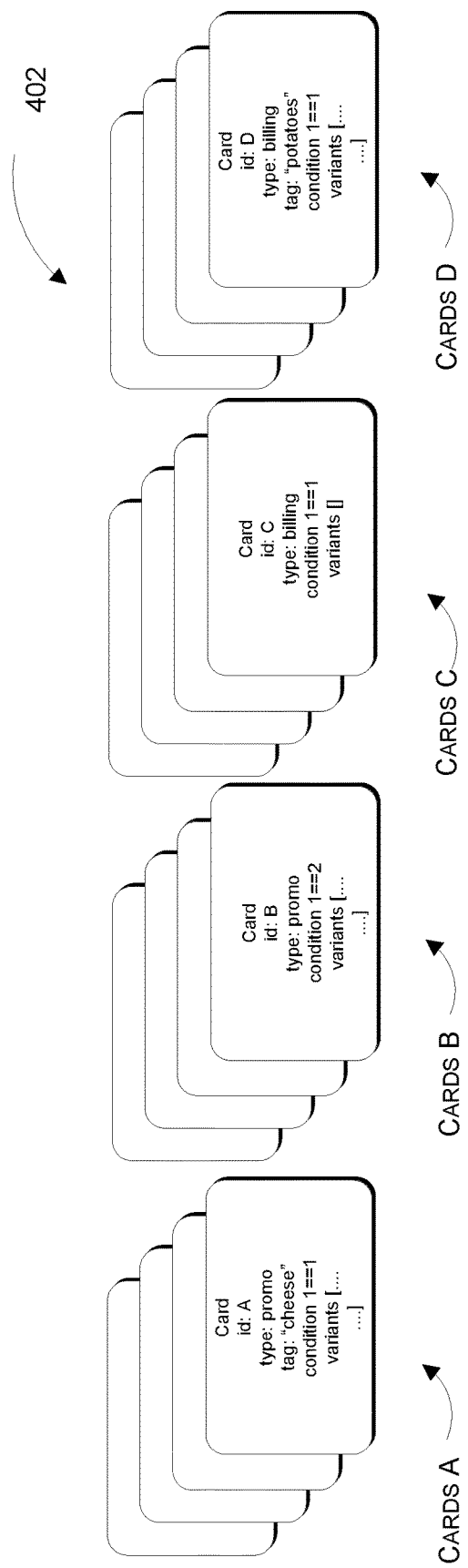
FIG. 4 illustrates exemplary cards that are grouped according to a theme or concept.

FIG. 4 illustrates exemplary cards 402 that are grouped according to a theme or concept. The cards 402 may include cards A (identified by id: A), cards B (identified by id: B), cards C (identified by id: C), and cards D (identified by id: D). Cards A have a tag "cheese" so as to be collected in response to a search for "cheese;" a true/false condition of "true" (1==1) (relative, e.g., to an A/B test), and variants that may differ from card to card. Cards B are promo cards (type: promo) that may show a promotion when surfaced and have a true/false condition of "false" (1==2) and variants. Cards C are billing cards and have a true/false condition of "true" but no variants. Cards D are also billing cards and have a tag "potatoes," a true/false condition of "true," and variants.

Figure 5:
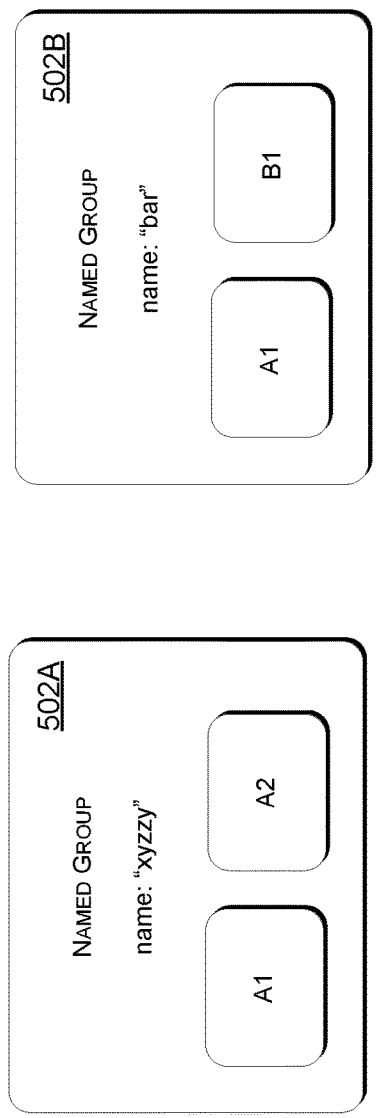
FIG. 5 illustrates examples of named group containers.

FIG. 5 illustrates examples of containers 502A and 502B. The container 502A is a named group container with the name "xyzzy" and contains the cards A1 and A2 (i.e., two of the cards A). The container 502B is a named group container with the name "bar" and contains the card A1 and the card B1 (i.e., one of the cards A and one of the cards B, respectively).

Referring to the example shown in FIG. 4 and FIG. 5, Cards A and Cards D are always available for surfacing (based, for example, on condition 1==1 and the presence of variants). Cards B are never available for surfacing as their conditions are always false (1==2), and Cards C are never available for surfacing as there are no variants for Cards C.

Figure 6:
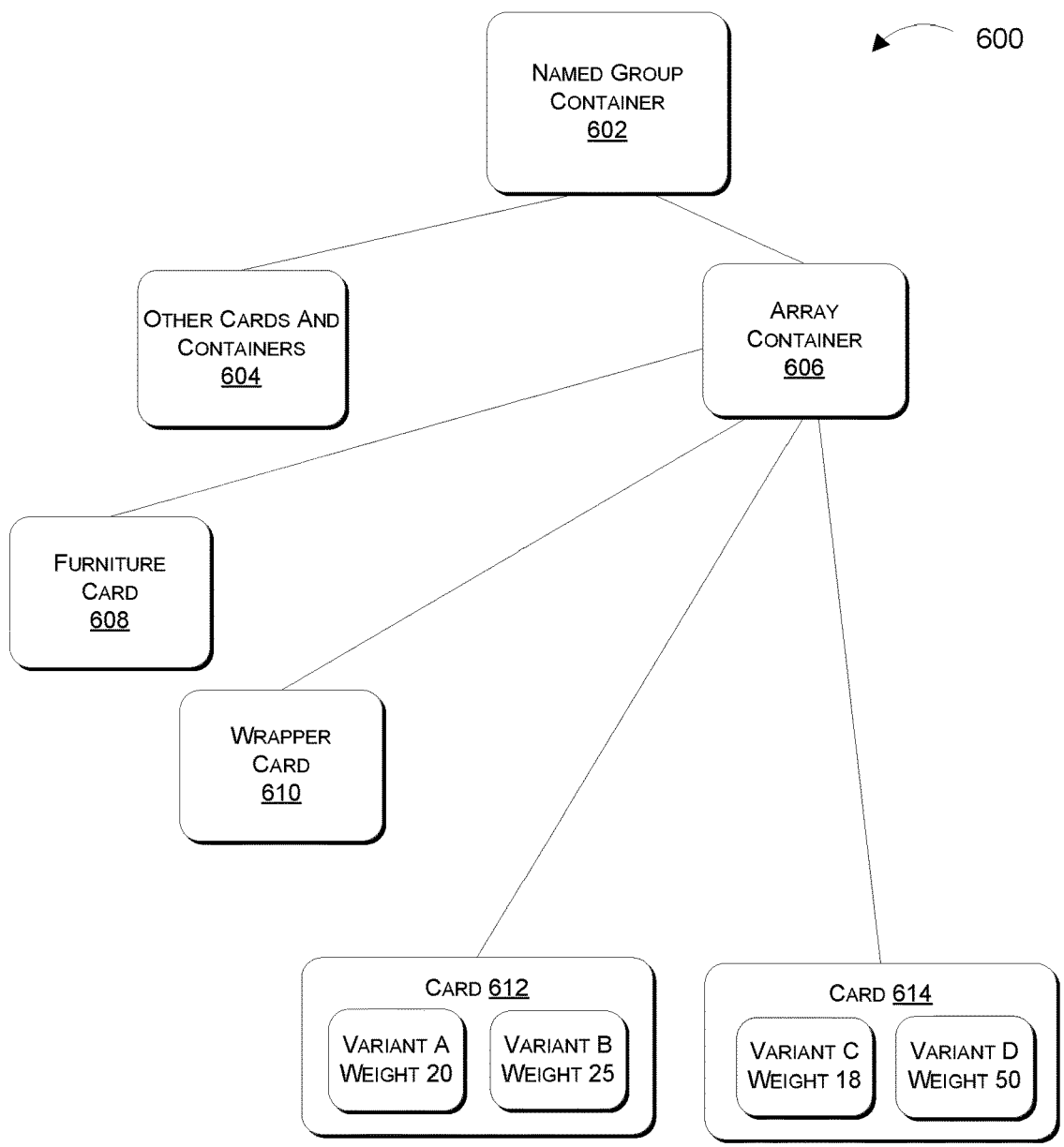
FIG. 6 illustrates an example of a container tree, which represents a container hierarchy created by the card engine.

FIG. 6 illustrates an example of a container tree 600, which represents a container hierarchy created by the card engine 132. The container tree 600 includes a top-level named group container 602 and, one level below the container 602, other cards and containers 604 and an array container 606.

An array container may permit an author to tailor content to be displayed in a particular way for individual clients and can be configured using various fields with which instances are created. Some examples include, but are not limited to:
array_fact—A string representing the name of an array fact. If an array fact is not present at card evaluation time, the evaluation of the array container is skipped.
furniture_card—The card definition that represents the top-level card returned when the array container is resolved.
wrapper_card—A card definition that represents a second-level card returned when the array container is resolved.
cards (subcards)—An ordered collection of card definitions that will be evaluated once per iteration of the given array_fact. The resulting cards from this evaluation may be added as subcards to that iteration's wrapper card.
max_iterations—An integer that represents the maximum number of wrapper cards that will be returned nested inside the furniture card when the array container resolves.
max_cards_per_iteration—An integer that represents the maximum number of subcards that any wrapper card can contain.
pre_sort—A boolean value (flag) that controls the order of subcards within a wrapper card. If true, the weight of each card will determine the order within the respective wrapper card (i.e., the subcards are sorted with the wrapper card). If false, the order in which the subcards exist in the container definition will determine their order. In some embodiments, this can promote uniformity in ordering between wrapper cards, instead of allowing the variant's weight to decide the order.

An array container may also contain other containers.

As shown in FIG. 6, the array container 606 may include a furniture card 608, a wrapper card 610, and cards 612 and 614. In some embodiments, the cards 612 and 614 may be evaluated and added to the wrapper card 610. The furniture card 608 may represent the top-level card returned when the array container 606 is evaluated. However, if the furniture card 608 does not evaluate, then no cards are returned. The furniture card 608 may be designed to group the entire result of the evaluation of array container 606, such that the furniture card 608 can surface (be displayed) alongside other cards on the user interface 206. The furniture 608 card may also be used to provide other data or features, such as a title, summary, CTAs, etc. for all content that could add context to iterable content in later-surfaced cards (e.g., a customer greeting and promo announcement).

The wrapper card 610 may represent a second-level card returned when the array container 606 is resolved. In some embodiments, the wrapper card 610 may represent the results of a single iteration over a given array fact. Although only one wrapper card is discussed herein, there may be more than one wrapper card, the number corresponding to the number of iterations. The wrapper card 610 may be designed to group a collection of cards that may evaluate from an iteration. For example, whilst iterating through a collection of cards related to one or more promotions, it may be desirable to return several cards relating to a single promotion. The wrapper card 610 could contain that promotion's name, a customer's name, a CTA, or any styling/branding for that promotion in the displayed card. Evaluated wrapper cards may be nested inside the top-level furniture card 608. However, in some embodiments, if the wrapper card definition does not exist in the cache 137, then no top-level cards are returned.

The furniture card 608 may have no access to array facts. Authors can continue to use customary and inherent facts, e.g., the user's name and residence, time of day, etc. However, the wrapper card 610 and subcards such as cards 612 and 614 may have access to customary and inherent facts, as well as access to their iterations' array facts.

In one or more embodiments, an iteration performed over each element of an array fact may include one or more of evaluating a wrapper card 610 (if the wrapper card does not evaluate, the current iteration is skipped), evaluating subcards (if no subcards evaluate into cards, the current iteration is skipped), sorting the evaluated subcards with respect to weight (and pre-sort flag), reducing the number of subcards to meet the max_cards_per_iteration value (if applicable), and adding the subcards into the wrapper card 610. The iterations are stopped if the max_iterations value is reached. Some or all of the wrapper cards may be added to the furniture card 608 and the furniture card 608 may be returned accordingly.

In the example shown in FIG. 6, the card 612 has a variant A with a weight 20 and a variant B with a weight 25. The weight of a variant may influence the presentation of cards and/or the order of presentation of cards to a given UE 102. In one or more embodiments, the sum of the weights of a card's variants may be the weight of the card. For example, the weight of the card 612 may be 45 (i.e., the sum of the weights of the variant A and the variant B) and the weight of the card 614 may be 68 (i.e., the sum of the weights of the variant C and the variant D). When a card definition is evaluated, the weighted values of the card's variants may change the value of the card itself.

FIGS. 7-17 show examples of evaluating various named group containers that contain cards and/or other containers.

Figure 7:
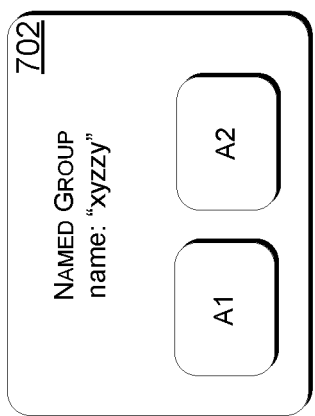
FIG. 7 illustrates an example of evaluating a named group container in which all cards are evaluated as able to be returned.

FIG. 7 illustrates an example of evaluating a named group container 702 ('xyzzy') in which all cards are evaluated as able to be returned.

In the illustrated example, the result of a request 1.0/evaluate/group/xyzzy may be:

```
cards:[
  {
    id: A1 . . .
  },
  {
    id: A2 . . .
  }
]
```

In this scenario, Cards A1 and A2 are both visible (i.e., valid and eligible to be returned) and are included. The named group container 702 ('xyzzy') is a logical container that vanishes during the evaluation process.

Figure 8:
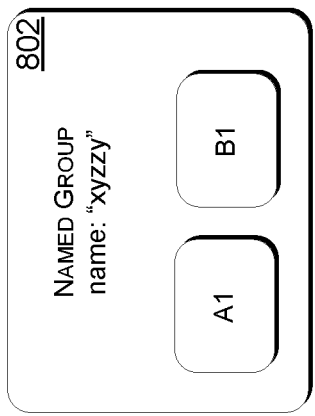
FIG. 8 illustrates an example of evaluating a named group container in which not all cards are evaluated as able to be returned.

FIG. 8 illustrates an example of evaluating a named group container 802 ('xyzzy') in which not all cards are evaluated as able to be returned.

In the illustrated example, the result of a request 1.0/evaluate/group/xyzzy may be:

```
cards:[
  {
    id: A1, . . .
  }
]
```

In this scenario, Card B1 is not visible (its condition is 1=2, i.e., always false), so only A1 is included. The named group container 802 ('xyzzy') is a logical container that vanishes during the evaluation process.

Figure 9:
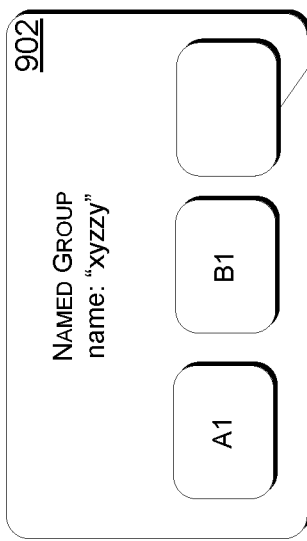
FIG. 9 illustrates an example of evaluating a named group container that contains a named group container.
Figure 9:
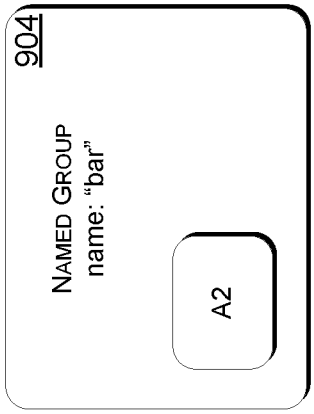

FIG. 9 illustrates an example of evaluating a named group container 902 ('xyzzy') that contains a named group container 904 (bar).

In the illustrated example, the result of a request 1.0/evaluate/group/xyzzy may be:

```
cards:[
  {
    id: A1 . . .
  },
  {
    id: A2 . . .
  }
]
```

In this scenario, Card B1 is filtered out. Cards A1 and A2 are both visible. The named group containers 902, 904 ('xyzzy', 'bar') both collapse during the evaluation process, resulting in the returned cards.

The result of a request 1.0/evaluate/group/bar may be:

```
cards:[
  {
    id: A2 . . .
  }
]
```

Card A2 is the only card in the named group container 904 ('bar') and is visible.

Figure 10:
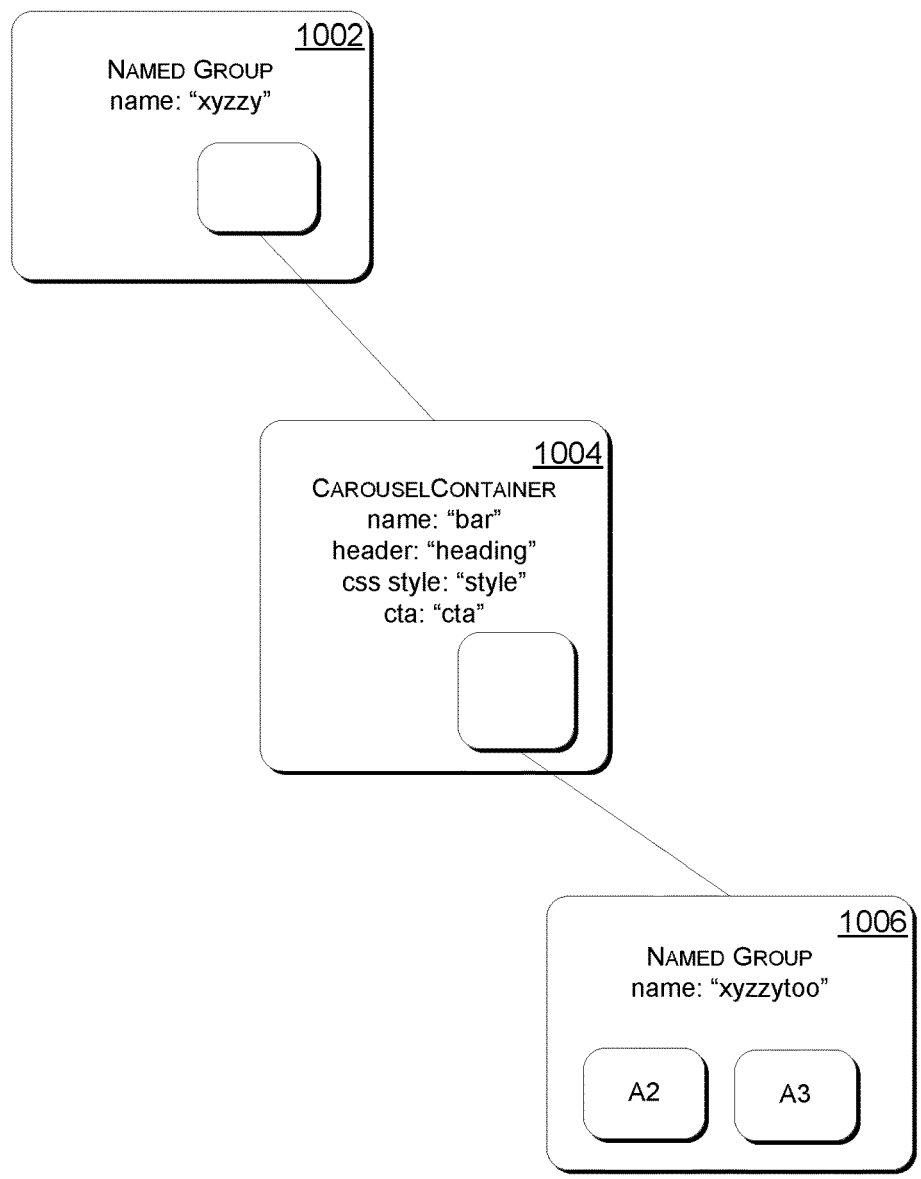
FIG. 10 illustrates an example of evaluating a named group container that contains a carousel container.

FIG. 10 illustrates an example of evaluating a named group 1002 ('xyzzy') container that contains a carousel container 1004 (bar).

In the illustrated example, the result of a request 1.0/evaluate/group/xyzzy may be:

```
cards:[
  {
    carousel: bar
    heading: "heading"
    CTA: cta
    css: style
    subcards: [
      {
        id: A2 . . .
      },
      {
        id: A3 . . .
      }
    ]
  }
]
```

In this scenario, Cards A2 and A3 are visible. The carousel container 1004 ('bar') does not collapse and leaves its markup in the evaluation output to inform the client how the carousel should be rendered.

The carousel container 1004 ('bar') contains a named group container 1006 ('xyzzytoo'). The result of a request 1.0/evaluate/group/xyzzytoo may be:

```
cards:[
  {
    id: A2 . . .
  },
  {
    id: A3 . . .
  }
]
```

Figure 11:
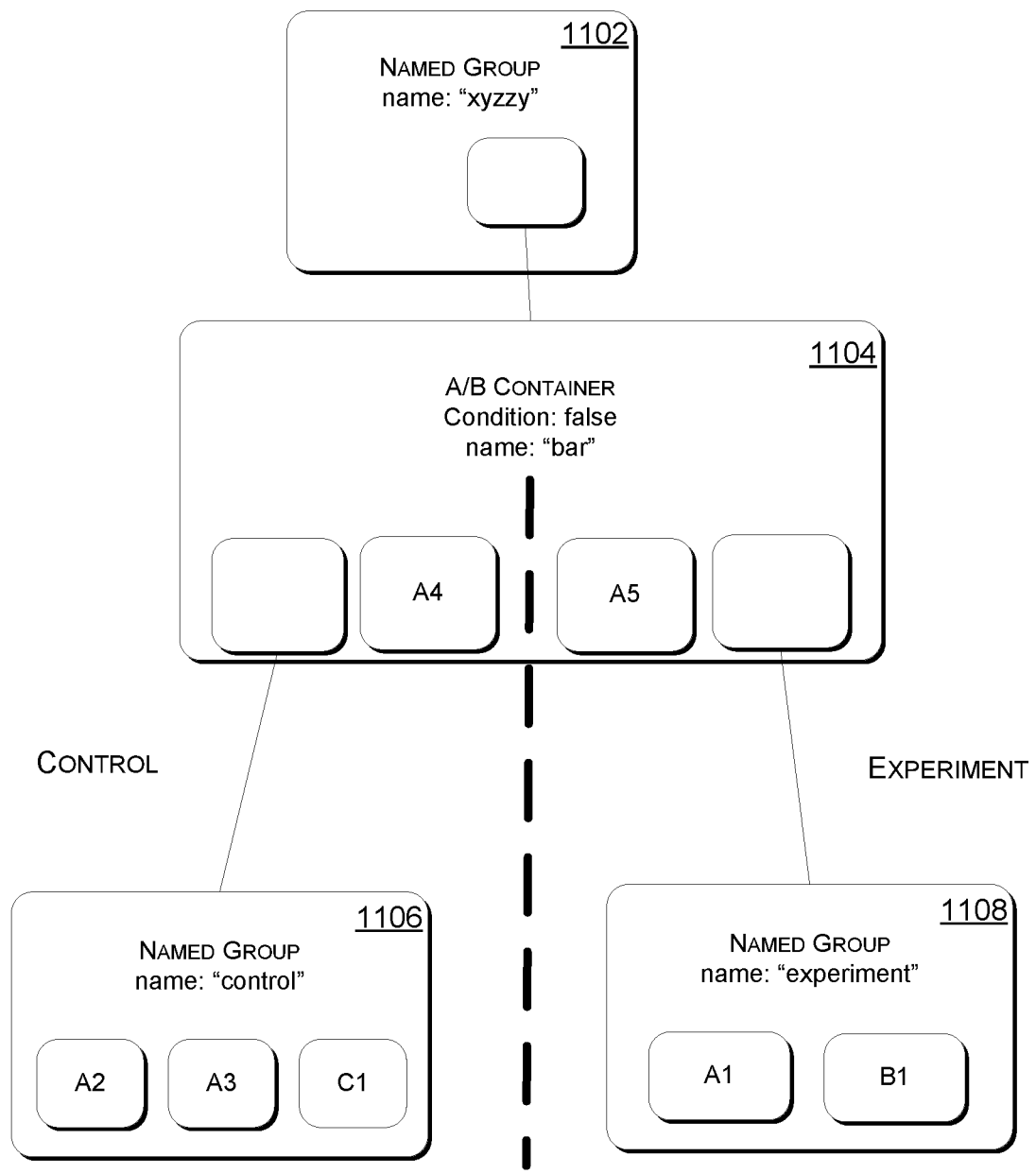
FIG. 11 illustrates an example of evaluating a named group container that contains an A/B test container, in which the condition of the A/B test evaluates to "false."

FIG. 11 illustrates an example of evaluating a named group container 1102 ('xyzzy') that contains an A/B test container 1104 (bar). The A/B test container 1104 contains a named group container 1106 ('control') and a named group container 1108 ('experiment'). In this scenario, the A/B test evaluates to "false."

In the illustrated example, the result of a request 1.0/evaluate/group/xyzzy may be

```
cards:[
  {
    id: A2 . . .
  },
  {
    id: A3 . . .
  },
```

```
    {
        id: A4 . . .
    }
]
```

The A/B container is false, so the control side of its contents are evaluated. This results in Cards A2, A3, A4 and C1 being evaluated. Card C1 is not visible. All of the containers 1102, 1104, and 1106 ('xyzzy', 'bar', 'control') are flattened and transparent to the client.

Figure 12:
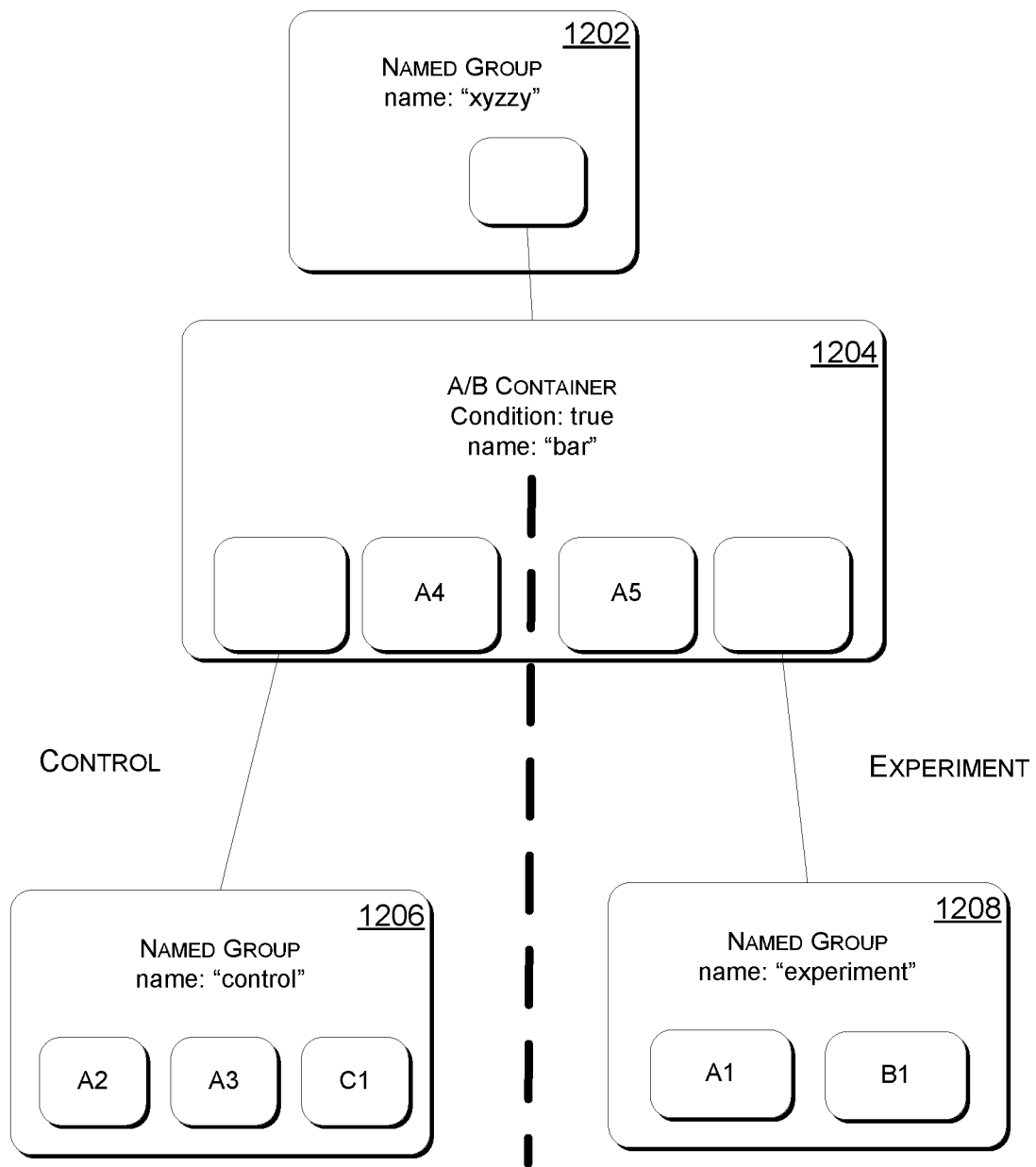
FIG. 12 illustrates an example of evaluating a named group container that contains an A/B test container, in which the condition of the A/B test evaluates to "true."

FIG. 12 illustrates an example of evaluating a named group container 1202 ('xyzzy') that contains an A/B test container 1204 (bar). The A/B test container 1204 contains a named group container 1206 ('control') and a named group container 1208 ('experiment'). In this scenario, the condition of the A/B test evaluates to "true."

In the illustrated example, the result of a request 1.0/ evaluate/group/xyzzy may be:

```
cards:[
    {
        id: A1 . . .
    },
    {
        id: A5 . . .
    }
]
```

The A/B container is true, so the experiment side of its contents is evaluated. This results in Cards A5, A1 and B1 being evaluated. Card B1 is not visible. All of the containers 1202, 1204, and 1208 ('xyzzy', 'bar', 'experiment') are flattened and transparent to the client.

Figure 13:
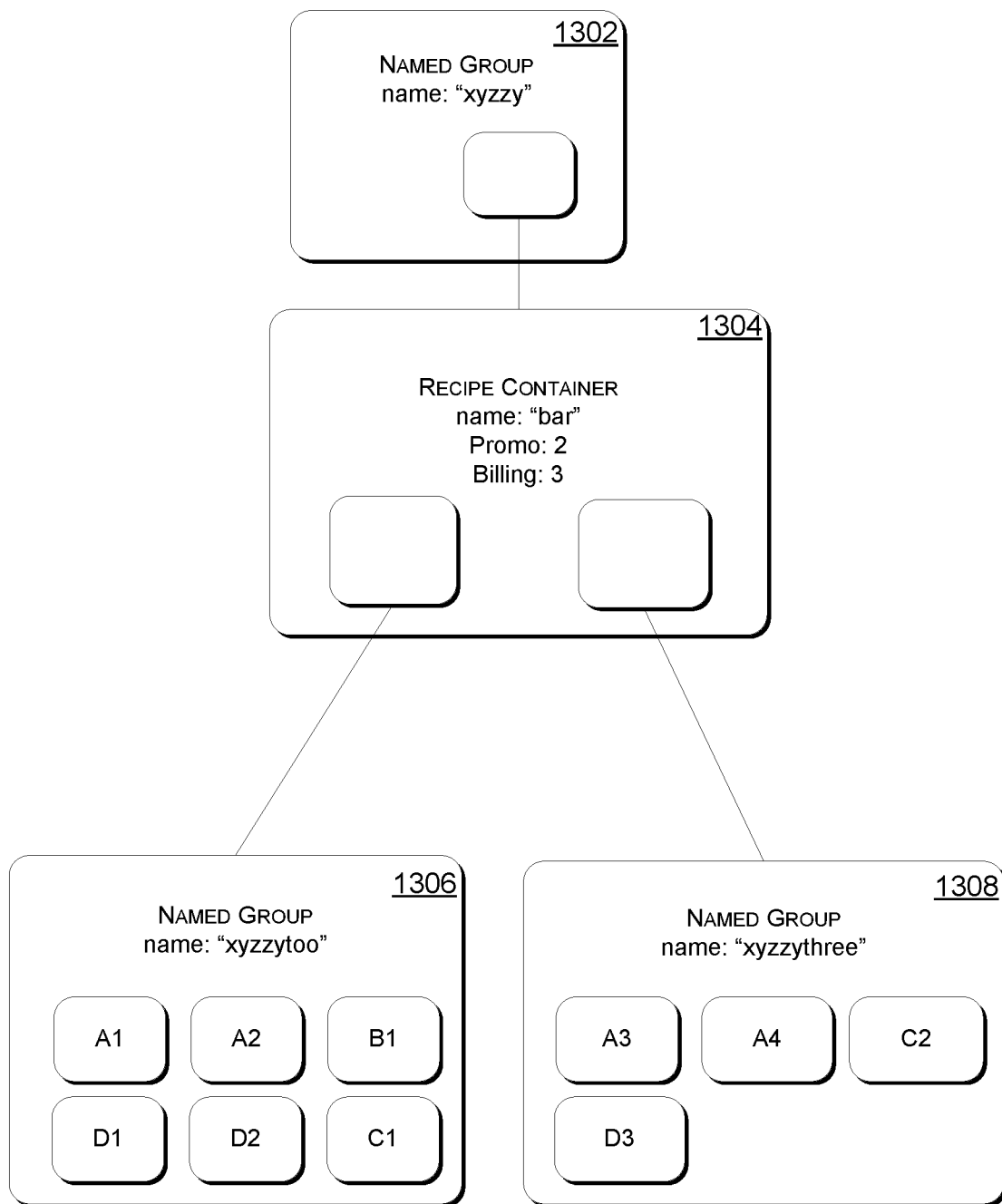
FIG. 13 illustrates an example of evaluating a named group container that contains a recipe container, and enough cards are available to fulfill a request for cards.

FIG. 13 illustrates an example of evaluating a named group container 1302 ('xyzzy') that contains a recipe container 1304 (bar). The recipe container 1304 contains a named group container 1306 ('xyzzytoo') and a named group container 1308 ('xyzzythree') below it in the tree. In this scenario, two promo cards and three billing cards are requested and enough cards are available to fulfill the request.

In the illustrated example, the result of a request 1.0/ evaluate/group/xyzzy may be:

```
cards:[
    {
        id: A1 . . .
    },
    {
        id: A2 . . .
    },
    {
        id: D1 . . .
    },
    {
        id: D2 . . .
    },
    {
        id: D3 . . .
    }
]
```

Cards of type promo may be evaluated until two visible cards (A1, A2) are found. Cards of type billing may be evaluated until three visible cards (D1, D2, D3) are found. Excess visible cards (A3, A4) and cards which do not meet visibility criteria (B1, C1, C2) may not be displayed. All of the containers 1302, 1304, 1306, and 1308 ('xyzzy', 'bar', 'xyzzytoo', 'xyzzythree') may be flattened and be transparent to the client.

Figure 14:
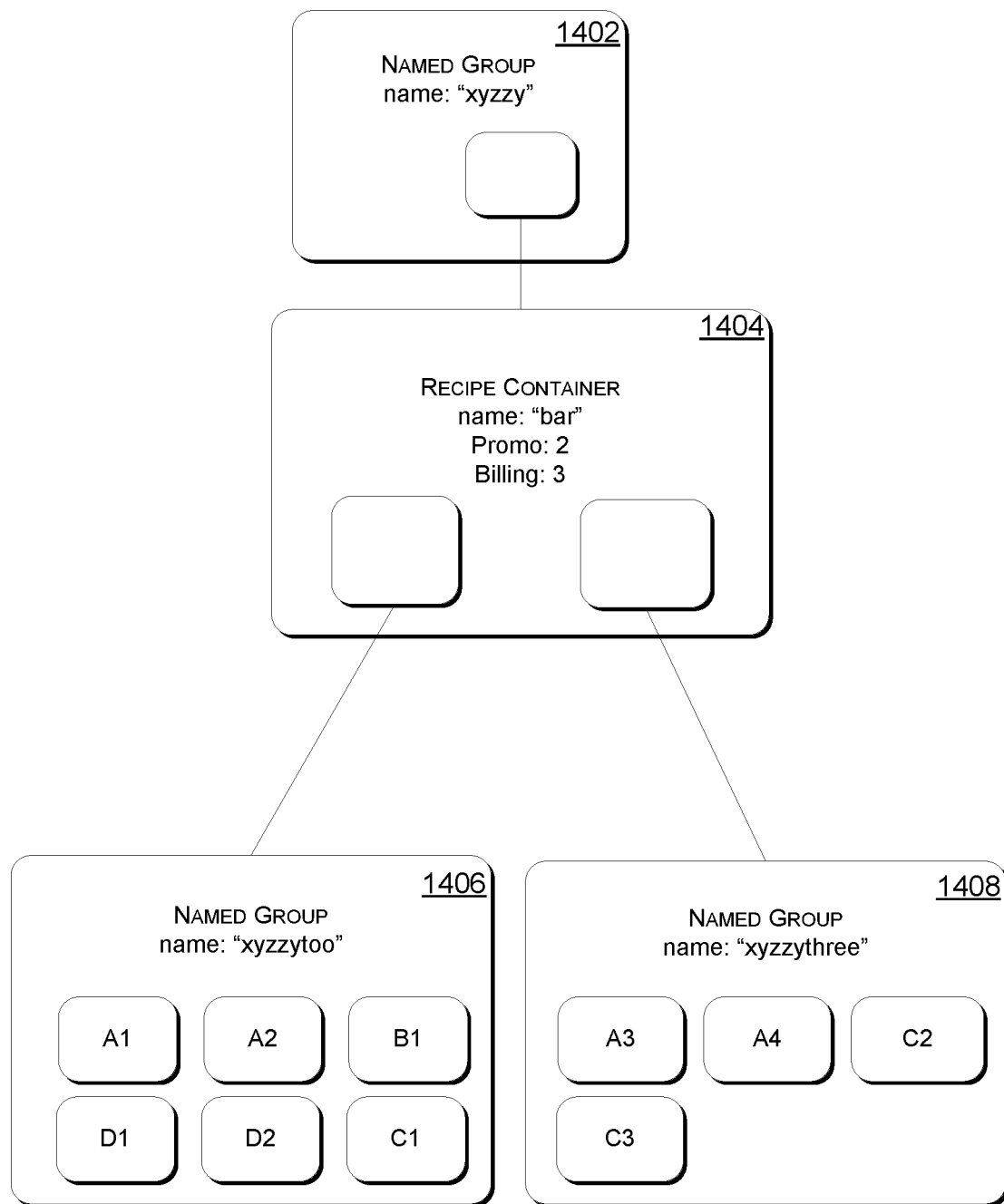
FIG. 14 illustrates an example of evaluating a named group container that contains a recipe container, but enough cards are not available to fulfill a request for cards.

FIG. 14 illustrates an example of evaluating a named group container 1402 ('xyzzy') that contains a recipe container 1404 (bar). The recipe container 1404 contains a named group container 1406 ('xyzzytoo') and a named group container 1408 ('xyzzythree') below it in the tree. In this scenario, two promo cards and three billing cards are requested, but enough cards are not available to fulfill the request.

In the illustrated example, the result of a request 1.0/ evaluate/group/xyzzy may be:

```
cards:[
    {
        id: A1 . . .
    },
    {
        id: A2 . . .
    },
    {
        id: D1 . . .
    },
    {
        id: D2 . . .
    }
]
```

Cards of type promo may be evaluated until two visible cards (A1, A2) are found. Cards of type billing may be evaluated until there are no more visible cards (D1, D2). Because the third billing card requested does not exist, nothing is returned for it. Excess visible cards (A3, A4) and cards which do not meet visibility criteria (B1, C1, C2, C3) may not be displayed. All of the containers 1402, 1404, 1406, and 1408 ('xyzzy', 'bar', 'xyzzytoo', 'xyzzythree') may be flattened and transparent to the client.

Figure 15:
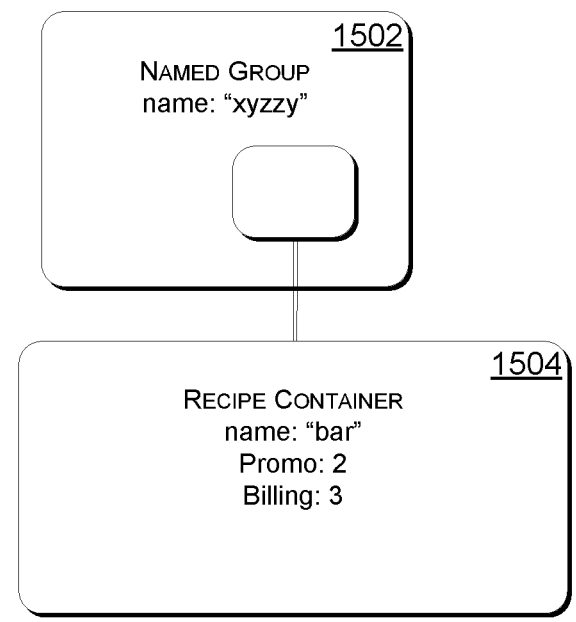
FIG. 15 illustrates an example of evaluating a named group container that contains a recipe container.
Figure 15:
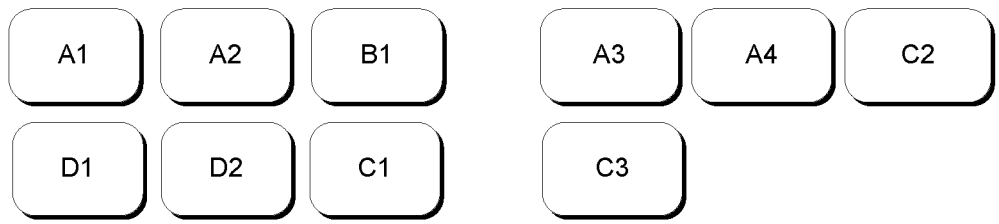

FIG. 15 illustrates an example of evaluating a named group container 1502 ('xyzzy') that contains a recipe container 1504 (bar). The recipe container has no named group containers below it in the tree. In this scenario, two promo cards and three billing cards are requested from among cards.

In the illustrated example, the result of a request 1.0/ evaluate/group/xyzzy may be:

```
cards:[
]
```

Cards under the recipe container 1504 may be evaluated until there are no more cards or the recipe is met. In this case, the recipe container 1504 ('bar') has no cards, and therefore no cards are returned.

Figure 16:
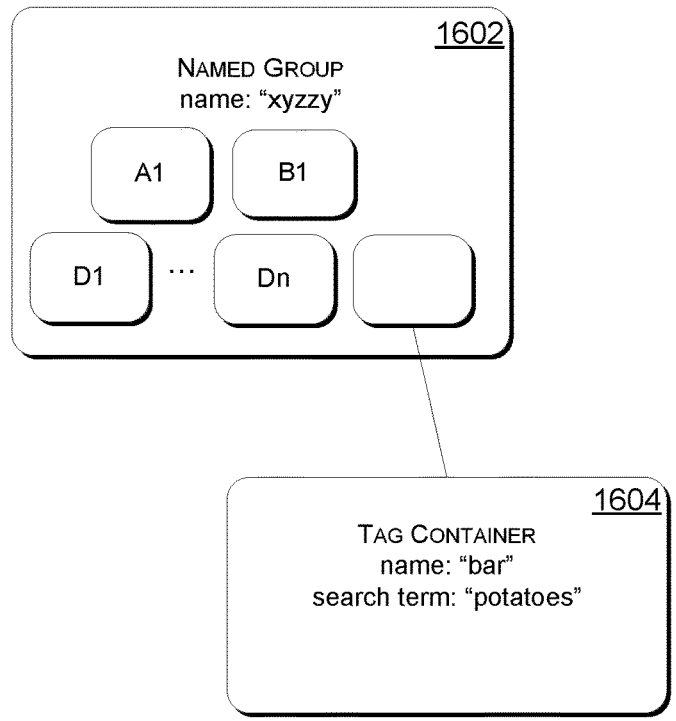
FIG. 16 illustrates an example of evaluating a named container that contains a tag container having the tag or search term "potatoes."

FIG. 16 illustrates an example of evaluating a named container 1602 ('xyzzy') that contains a tag container 1604 ('bar') having the tag or search term "potatoes."

In the illustrated example, the result of a request 1.0/ evaluate/group/xyzzy may be:

```
cards:[
    {
        id: A1, . . .
    },
    {
        id: D1, . . .
```

-continued

```
    },
    {
        id: D2, ...
    },
    ...,
    {
        id: Dn, ...
    }
]
```

In this scenario, Card A1 is visible and returned. Card B1 is not visible and not returned. All cards tagged with "potatoes" that are visible (D1-Dn) are returned. Both of the containers 1602, 1604 ('xyzzy', 'bar') may be flattened and be transparent to the client.

In the illustrated example, the result of a request 1.0/evaluate/group/bar may be:

```
cards:[
]
```

The tag container 1604 ('bar') is of a type which has no external identifier and is not returned to the client.

Figure 17:
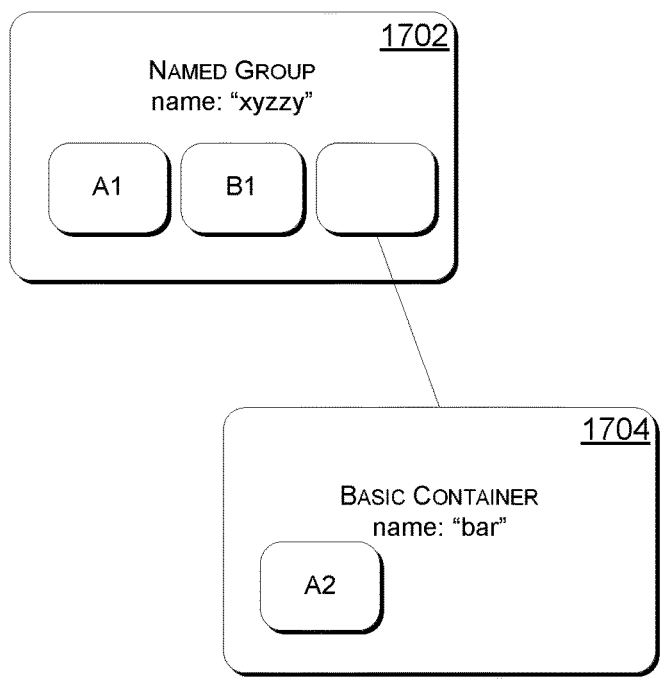
FIG. 17 illustrates an example of evaluating a named group container that contains a basic container.

FIG. 17 illustrates an example of evaluating a named group container 1702 ('xyzzy') that contains a basic container 1704 (bar).

In the illustrated example, the result of a request 1.0/evaluate/group/xyzzy may be:

```
cards:[
    {
        id: A1, ...
    },
    {
        id: A2, ...
    }
]
```

Cards A1 and A2 are both visible and are included. Card B1 is not visible and is not included. Both of the containers 1702, 1704 ('xyzzy', 'bar') may be flattened and transparent to the client.

Result of 1.0/evaluate/group/bar is:
cards:

The container 1704 ('bar') is of a type which has no external identifier and is not returned to the client.

FIGS. 18 and 20-22 present illustrative processes for implementing the card engine 132, the facts controller 136, and the rules engine 140. The processes are illustrated respectively as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1.

Figure 18:
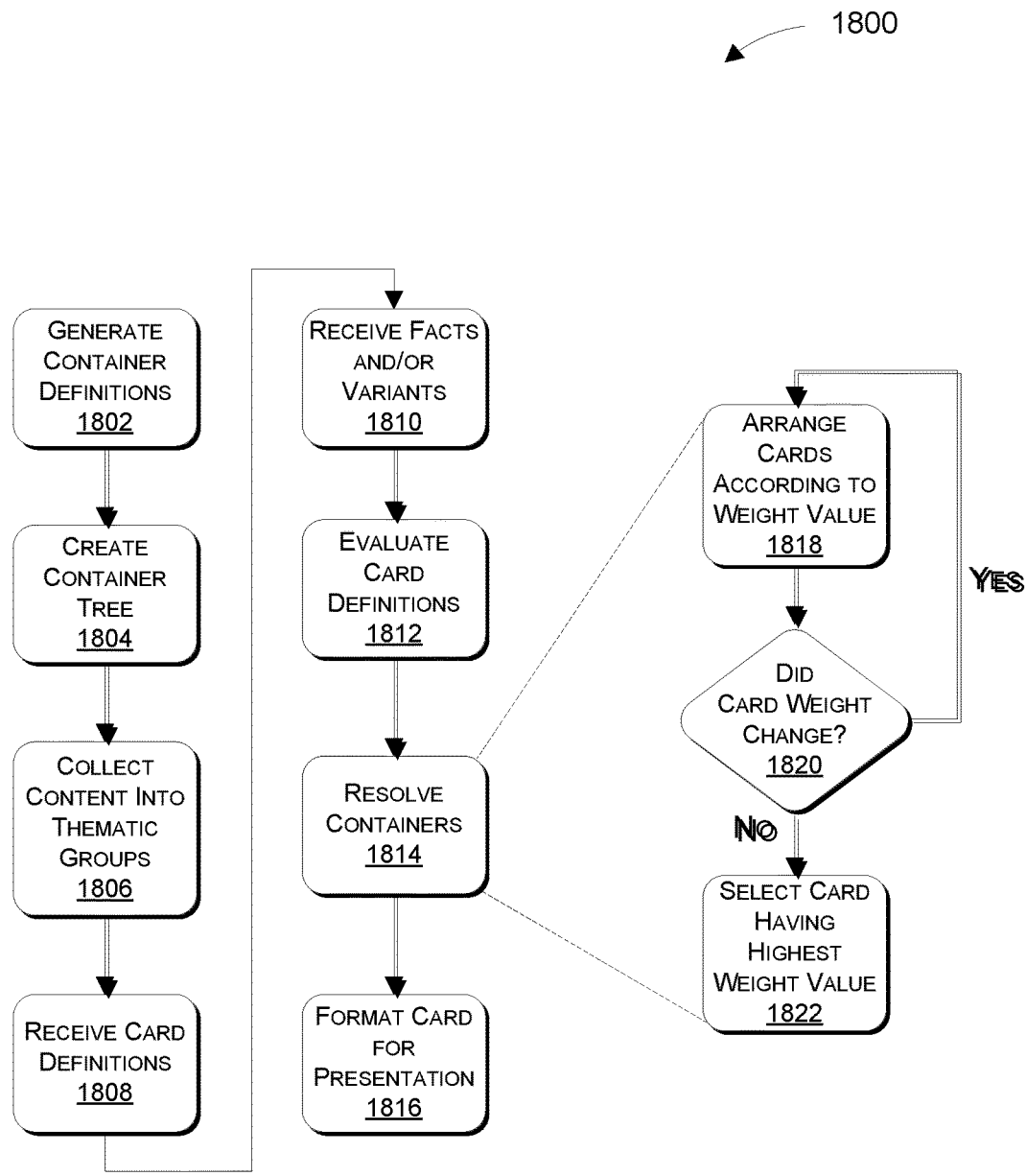
FIG. 18 presents an illustrative process for implementing the card engine.

FIG. 18 is a flow diagram of an example process 1800 performed at least in part by the card engine 132 for generating and surfacing one or more cards. At block 1802, the card engine 132 may generate container definitions. The container definitions may represent logical groupings of cards according to theme or concept. Container definitions are resolved into containers that may contain zero or more cards in accordance with various embodiments including those described herein.

At block 1804, the card engine 132 may create a container hierarchy to organize containers for determining cards to be surfaced. Using the example of FIG. 6, the container tree 600 may contain, for example and without limitation, the named group container 602, the other cards and containers 604, and the array container 606. However, other hierarchies may be created, including hierarchies without array containers such as those described herein and other hierarchies consistent with this disclosure.

At block 1806, the card engine 132 may collect content into thematic groups (e.g., promo, billing to name two possibilities). Examples of content may include but are not limited to greetings, banners, facts (unique and non-unique), product or service offering, or other data related to a consumer's environment or habitual routine (e.g., weather forecast, traffic conditions, etc.).

At block 1808, the card engine 132 may receive card definitions, e.g., from the rules engine 140. Card definitions are evaluated into cards in accordance with facts that may be obtained from the facts controller 136; examples are described herein. Card definitions may also include conditional statements, which may determine whether a card, or a variant thereof, is presented via the user interface 206 and may be defined by the rules engine 140.

At block 1810, the card engine 132 may receive facts and/or variants from the facts controller 136. Facts and variants are used by the card engine 132 to evaluate card definitions.

At block 1812, the card engine 132 may evaluate card definitions in accordance with the facts/variants received at block 1810 in accordance with various embodiments including those described herein. The result of evaluating card definitions is cards that, as available, may be transmitted to the UE 102 for presentation.

At block 1814, the card engine 132 may resolve containers in the container tree 600. Resolving containers may include rotating evaluated cards up the container tree 600 until surfacing. The cards may rise in the container tree 600 in order of weight (i.e., the card in a container having the highest weight of all cards in the container may rotate up first, followed by the card having the next highest weight, etc.) or otherwise. Block 1814 may occur at the same time as block 1812.

At block 1816, the cards that have reached the top-level container are formatted for transmission to the UE 102 and presentation via the application 222*a* and the user interface 206.

Block 1814 may include blocks 1818, 1820, and 1822 in some embodiments. At block 1818, the card engine 132 may arrange the cards according to weight value. As described above, the weight of a card may vary with the weight(s) of its variant(s). Further, the card having the highest weight of all cards in the same container may rotate up to the next-level container first among such cards, followed by the card having the next highest weight, etc.

As described above, card weighting may change in accordance with weight changes in its variants. Any changes in the weight of a card may impact when or even whether the card will surface. At decision block 1820, the card engine 132 may determine whether a card's weight has changed (due, e.g., to a change in weight of one or more of its variants). The "determination" may be based on, e.g., receiving a change indication from the rules engine 140. If the card engine 132 determines that a card's weight has changed ("yes" at decision block 1820), the process may return to block 1818, where the cards in the container will again be arranged according to weight value. If the card engine 132 determines that a card's weight has not changed ("no" at decision block 1820), the process may proceed to block 1822. At block 1822, the card engine selects the card having the highest weight value of all cards in the container, and the process 1800 may proceed to block 1816.

Figure 19:
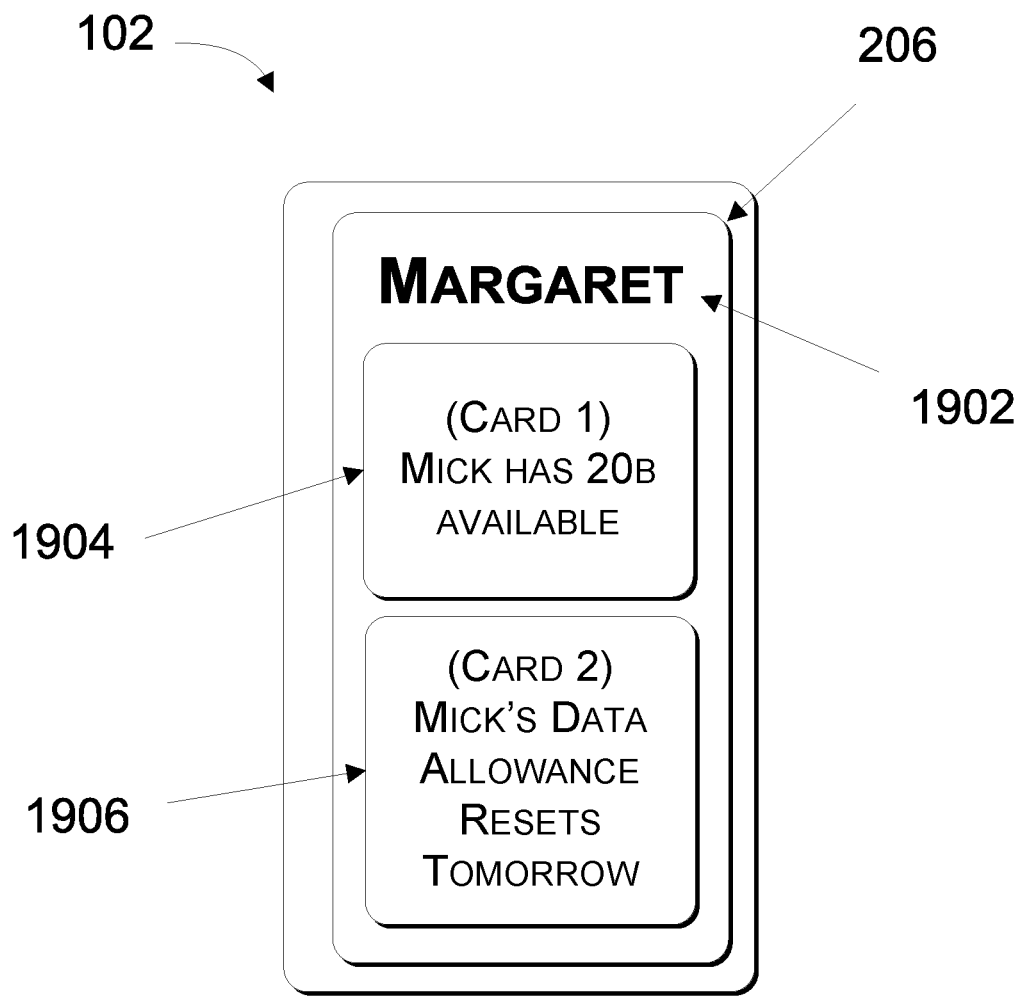
FIG. 19 illustrates an example of a display via a user interface of a UE, resulting from requests for cards.

FIG. 19 illustrates an example of a resulting display via the user interface 206 of the UE 102 in accordance with the process 1800. In the illustrated example, the UE 102 may belong to a consumer named "Margaret" whose nickname is "Mick."

Margaret's name 1902 is shown displayed at the top of the user interface 206. The name "Margaret" and the placement of "Margaret" are examples of facts that may be provided by the facts controller 136 for evaluation of a card definition corresponding to the name and location of its presentation. For example, when the application 222a opens (e.g., automatically when Margaret powers on the UE 102 or selects the application 222a), a request for the card(s) that relate to the name and placement of "Margaret" may be handled by the card engine in accordance with the process 1800. The related cards may be surfaced and returned in response to the request, formatted for display via the user interface 206 in accordance with prescriptions made by the provider of the cards (e.g., the telecommunications carrier) or in accordance with preferences chosen by Margaret.

In a similar way, a card 1904 (Card 1) and a card 1906 (Card 2) may be presented in accordance with initial settings or dynamic requests for cards. For example, Card 1 and Card 2 may be provided by the telecommunications carrier automatically at login by Margaret, as a greeting. In one or more embodiments, Card 1 may have surfaced first in response to a request from the UE 102 at login. In one or more embodiments, Card 2 may have been provided as a response to a call to action by Margaret. As shown in FIG. 19, both Card 1 and Card 2 address Margaret by her nickname "Mick," which may have been provided by Margaret at a time of registration or phone setup, for example, or at any other time. As may be the case with the greeting, information, and/or placement of information in the display via the user interface 206, the nickname may be a fact stored in and/or provided by the facts controller 136 for evaluation of one or more card definitions.

Figure 20:
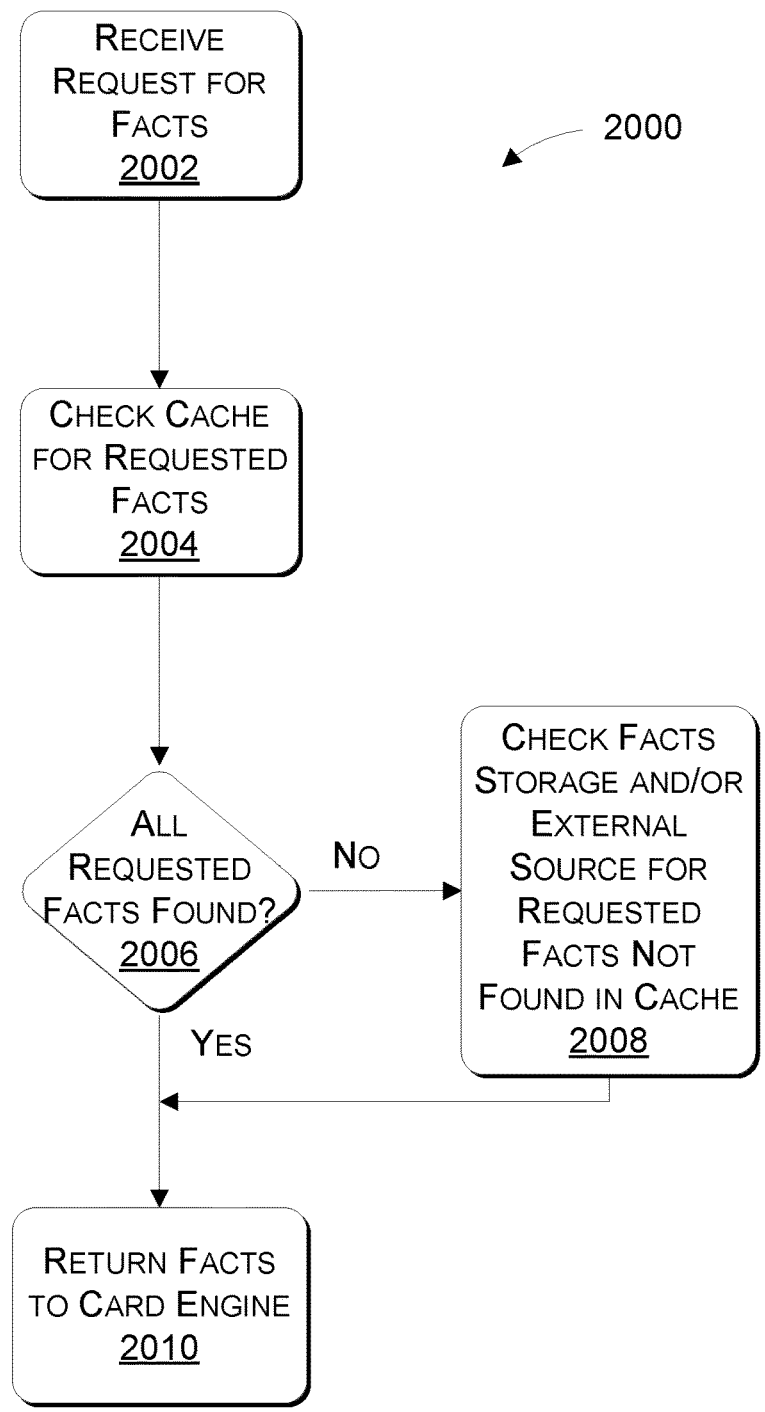
FIG. 20 is a flow diagram of an example process 2000 performed at least in part by the facts controller 136 for collecting, receiving, or otherwise obtaining facts and/or data, and making facts available, substantively and in real time.

FIG. 20 is a flow diagram of an example process 2000 performed at least in part by the facts controller 136 for collecting, receiving, or otherwise obtaining facts and/or data, and making facts available, substantively and in real time. In one or more embodiments, the facts controller 136 may receive a request for facts related to a given user, check the cache 137 for the requested facts, check the facts storage 138 for facts not found in the cache 137, optionally requesting facts from one or more fact sources external to the facts cache 137 and facts storage 138 to retrieve any facts that may be missing, and returning facts to the card engine to fulfill the request.

At block 2002, the facts controller 136 may receive a request for facts. For example, and without limitation, the request for facts may be received from the card engine 132 responding to an action made via the user interface 206 such as user selection (e.g., "click") of a displayed button, text, or other feature or region associated with a hyperlink. In another example, the request for facts may come from the rules engine 140 seeking facts to establish or update rules for the card engine 132 to evaluate card definitions.

At block 2004, the facts controller 136 may respond to the request for facts by checking the cache 137 for the presence of one or more of the requested facts. Any requested fact present in the cache 137 may be returned to the card engine 132 by the facts controller 136. However, facts in the cache 137 that meet the values of the requested facts will not be returned under certain circumstances, such as, and without limitation, if the fact has expired or the sensitivity is such that the fact may not be returned.

At block 2006, the facts controller 136 may determine whether all requested facts were found in the cache 137 (i.e., the request can be completely fulfilled from the cache). If the facts controller 136 determines that fewer than all facts were found in the cache 137 ("no" at decision block 2006), the process may proceed to block 2008. At block 2008, the facts controller may check the facts storage 138 and/or a source external to the facts storage 138 and cache 137 for the missing facts. Any of the requested facts that are not present in the cache 137 but are found in the facts controller 136 or external source may be returned to the card engine 132. However, any such facts will not be returned if return is prohibited, for example and without limitation, by a sensitivity value.

Facts may be received from an external source as a result of the check at block 2008. In some embodiments, a source may set an expiry date/time for the fact or facts, which may override any TTL (Time To Live) set for the cache 137. The source may set the sensitivity as well.

In general, the facts controller 136 may deposit facts received from an external source in the cache 137 and used for any suited purpose, including but not limited to retrieving alerts related to them. The same may be true for facts received from the card engine 132 in the request, from a developer, or from another source. After checking the facts storage 138 and/or external source, the process 2000 may proceed to block 2010.

If the facts controller 136 determines at decision block 2006 that all requested facts were found in the cache 137 ("yes" at decision block 2006), the process may proceed to block 2010. At block 2010, the facts controller 136 may return to the card engine 132 all eligible facts found in the cache 137 at block 2004 and all eligible facts found in the facts storage 138 and/or external source at block 2008.

Figure 21:
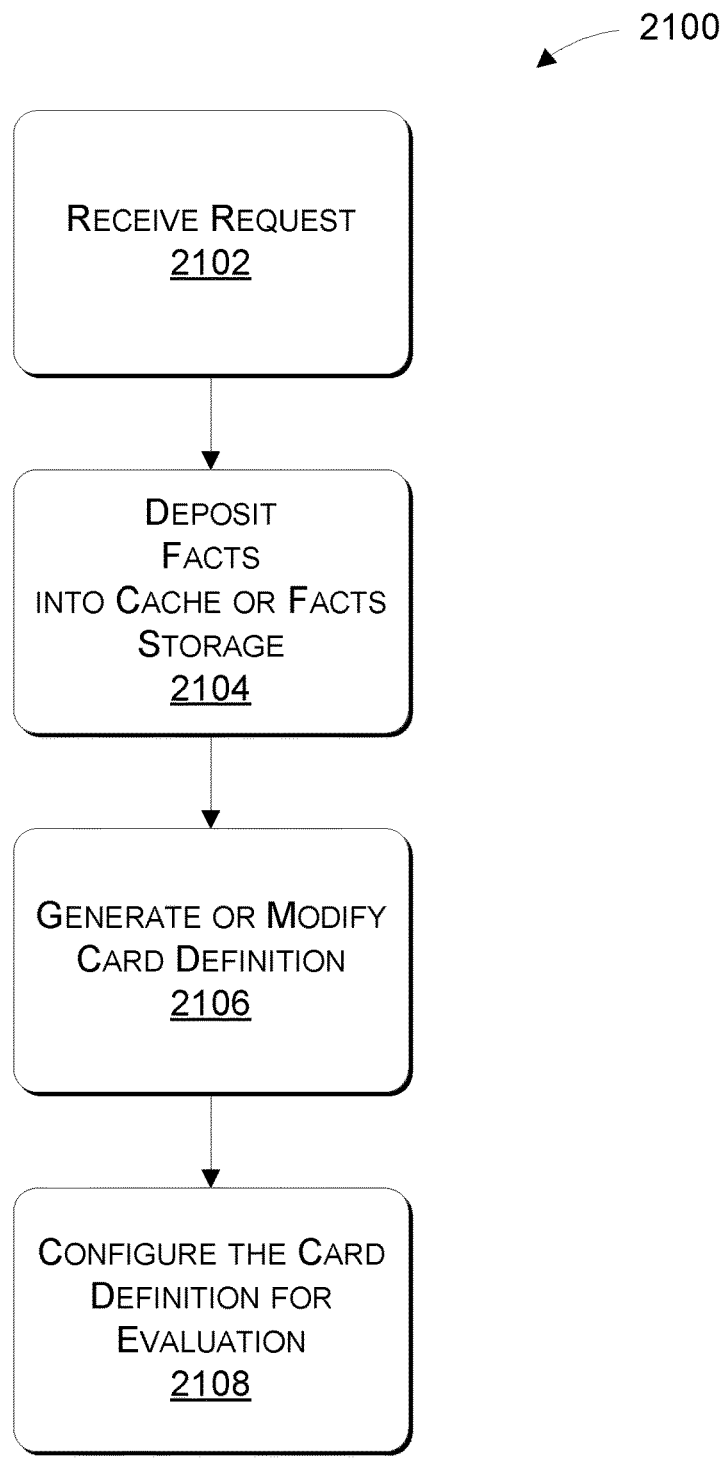
FIG. 21 is a flow diagram of an example process performed at least in part by the rules engine for applying business logic in accordance with rules established for generating or modifying card definitions in response to receiving facts.

FIG. 21 is a flow diagram of an example process 2100 performed at least in part by the rules engine 140 for applying business logic in accordance with rules established for generating or modifying card definitions in response to receiving facts. In one or more embodiments, the rules engine 140 may receive facts from the facts controller 136 or other source, set or adjust card variant weights in accordance with the received facts, and generate or modify card definitions in accordance with the variants and variant weights, In some embodiments, the rules engine 140 may receive facts related to a specific device and retrieve alerts related to those facts.

At block 2102, the rules engine 140 may receive a request, from a source external to the fact storage 138, that includes facts relevant to evaluating a card definition or alert. In some embodiments, the request may be received in response to a query from the rules engine 140. The request may include at least one identifier (e.g., MSISDN, IMEI, or IMSI), an audience, and at least one fact, in a form similar to the following nonlimiting example:

```
{
    "msisdn": "1234567890",
    "imei": "123456789101112",
    "imsi": "211101987654321",
    "audience": "public",
    "facts": {
        "odd.makemodel": {
            "timestamp": "2016-12-01T23:32:01-08:00",
            "source": "d3",
            "value": "Pixi2-7_4G_AAA"
        },
        "odd.device.software.screentimeout": {
            "timestamp": "2016-12-01T23:32:01-08:00",
            "source": "d3",
            "value": 121,
            "expiry": 12345678946456
        }
    }
}
```

At block 2104, facts received with the request may be deposited in the cache 137. Facts may be stored additionally or alternatively in the facts storage 138.

At block 2106, the rules engine 140 may generate a card definition or modify an existing card definition by updating the variant weight or weights of the existing card definition in accordance with the received facts. For example, the rules engine 140 may generate a new card definition in response to a developer's CREATE request, or automatically increase the weight of a variant related to a CTA based on an increased frequency of selection by a user.

At block 2108, the rules engine 140 may configure the generated or modified card definition for evaluation, e.g., by the card engine 132. In some examples, the new or modified card definitions may be made available to the card engine 132 by appropriate call in response to a client request for cards as described above, for example. The card definition may then be evaluated using facts available in the cache 137, the facts storage 138, and/or other fact sources as described herein. In this way, the presentation of the cards via the user interface can be dynamically changed substantively and in real time in accordance with the dynamic nature of creating new card(s) or changing variant(s) in response to any of numerous factors as described herein.

Figure 22:
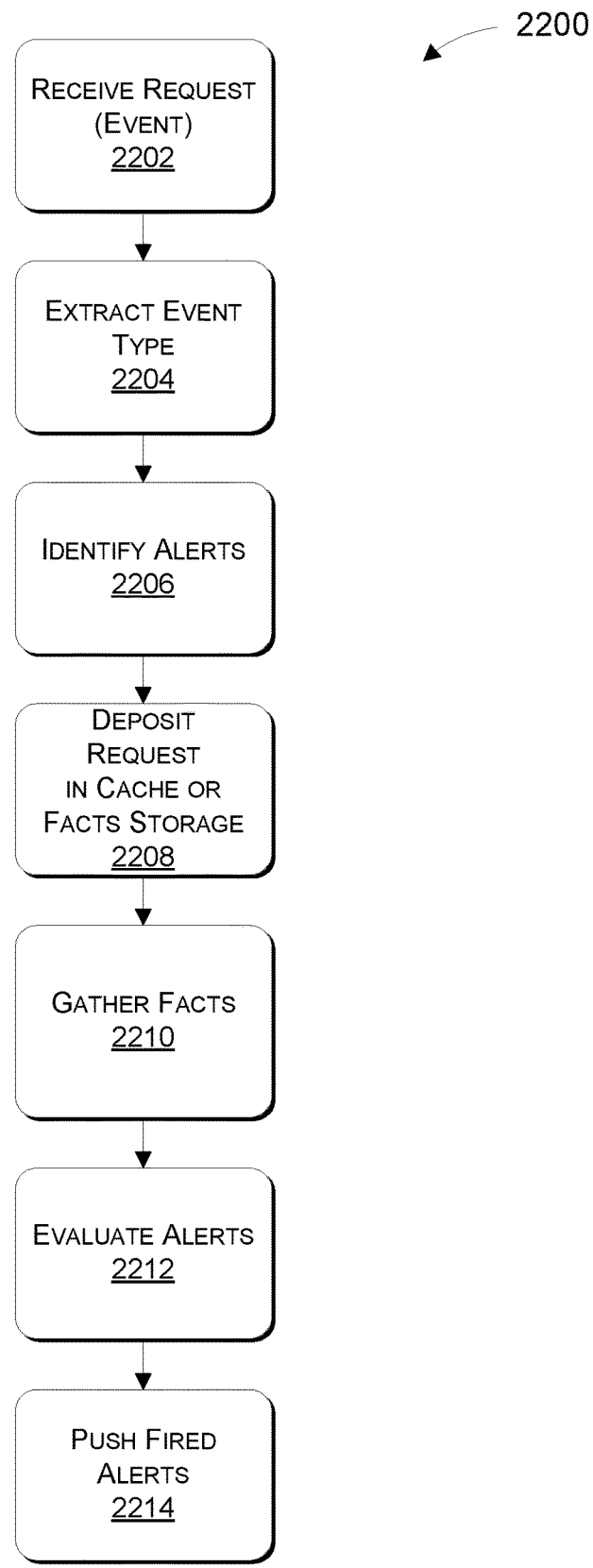
FIG. 22 is a flow diagram of an example process performed at least in part by the rules engine for applying business logic in accordance with rules established for generating and modifying card definitions in response to receiving an event to trigger an alert.

FIG. 22 is another flow diagram of an example process 2200 performed at least in part by the rules engine 140 for applying business logic in accordance with rules established for generating and modifying card definitions in response to receiving an event to trigger an alert. In one or more embodiments, the rules engine 140 may receive an event in a request (e.g., a POST request) and generate or modify card definitions in accordance with the variants and variant weights, In some embodiments, the rules engine 140 may evaluate alerts in accordance with received facts and deliver the alerts in response to a trigger.

At block 2202, the rules engine 140 may receive a request that includes information about an event in response to which one or more alerts may be triggered. The request may include the type of event and one or more of an identifier (e.g., MSISDN, IMEI, or IMSI), an audience, and one or more facts, in a form similar to the following nonlimiting example:

```
{
    "msisdn": "1234567890",
    "imei": "111112222233333",
    "imsi": "11111222233334",
    "audience": "phoneapp",
    "identifiers":{
        "chub_id": "11111222233332",
        "userid": "user@user.com"
    },
    "event": {
        "event_type": "device.shipped", // alerts that map to value will be evaluated when this event is dropped
        "event_id": "b70efdce-33a5-4b5a-8a9f-a619fe673ff9", // UUID as nonlimiting example
        "timestamp": "2017-08-03T16:28: 10Z",
        "source": "billingSys",
        "event_facts": { // kv map that can be added to the rest of the given facts
            "reference": "5042501EN",
            "courier": "Courier",
            "tracking_no": "1111111111",
            "parcel_weight": 2.35,
            "shipped_on": "2017-08-02T20:58:07-08:00",
            "shipped_type": "Overnight Express",
            "view_url": "https://shipper.com/vieworderstatus?trackno=1111111111"
        }
    },
    "facts": {
        // As with other endpoints
    }
}
```

At block 2204, the rules engine 140 may extract the event type from the request. The event type may indicate the event that will trigger certain alerts according to a set mapping that may be accessed by the rules engine 140.

At block 2206, the rules engine 140 may identify alerts that are configured to be fired by the event type extracted at block 2204.

At block 2208, the request received at block 2202 may be stored in the cache 137 or the facts storage 138 for subsequent retrieval. For example, facts related to the event may be contained in the request and thus made available for retrieval when evaluating the alerts.

At block 2210, the rules engine 140 may gather additional facts to evaluate the alerts identified at block 2206. Such additional facts may be gathered from the cache 137, the facts storage 138, or an external source such as a library, and may be retrieved by pushed to the rules engine 140.

At block 2212, the rules engine 140 may evaluate the alerts identified at block 2206 using the facts contained in the request and stored in the cache 137 and/or the facts storage 138, and any other facts such as those gathered at block 2210.

At block 2214, the rules engine 140 may push all fired alerts to the user or to a service. String substitutions may be made as needed. In this way, the event that drops may trigger alerts in accordance with the various facts described above, with changes made dynamically and substantively in real time.

Figure 23:
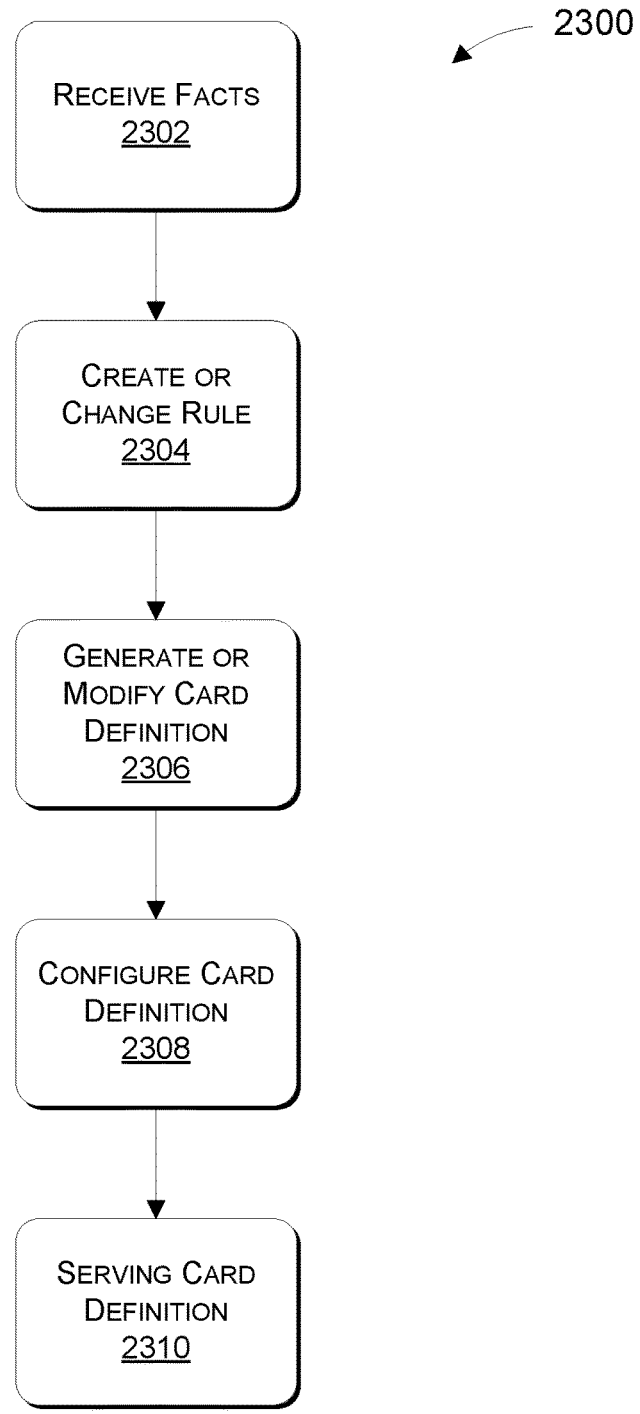
FIG. 23 is a flow diagram of an example process performed at least in part by the rules engine for applying business logic in accordance with rules established for generating and modifying card definitions in response to receiving an input to create or change a rule.

FIG. 23 is a flow diagram of an example process 2300 performed at least in part by the rules engine 140 for applying business logic in accordance with rules established for generating and modifying card definitions in response to receiving an input to create or change a rule. In one or more embodiments, the rules engine 140 may receive an input indicating a change to one or more rules and generate or modify card definitions in accordance with the input, At block 2302, the rules engine 140 may receive facts from the facts controller 136 or another source. In some embodiments, the facts may be customer-specific unique facts and customer-nonspecific non-unique facts. The rules engine 140 may process the facts to incorporate them into card definitions as described above.

At block 2304, the rules engine 140 may create or change a rule in accordance with an input. In some embodiments, one or more rules are created for the surfacing of a card for display, the card resulting from evaluation of a card definition in accordance with one or more of the collected facts as described above. Additionally or alternatively, the rules engine 140 may receive an input to change one or more of the rules and modify the card definition substantively and in real time in accordance with the input. The modification of the card definition may be in response to user activity indicated in the input to change one or more of the rules. For example and without limitation, if a user indicates lack of interest in a surfaced card by insubstantially (rarely or never) interacting with it, or if the user continually taps to avoid the card, then an appropriate rule may be changed (e.g., by changing corresponding variant weights) so that the card does not surface. In another example, a user may opt out of a particular card, in which case the appropriate rule is changed to prevent that card from surfacing to that user. In yet another example, patterns in the received facts may be analyzed (e.g., by machine learning) to determine, in a dynamic and continually updated fashion, changes in rules based on general user behavior, whether changing or refined.

At block 2306, the rules engine 140 may generate or modify the card definition in accordance with the rule(s) as created or changed according to block 2304. Generating or modifying the card definition may be in accordance with embodiments described herein.

At block 2308, the rules engine 140 may configure the card definition for the card engine 132 in accordance with the generated or modified card definition and in accordance with embodiments described herein.

At block 2310, the card definition may be served, e.g., to the card engine 132 in accordance with embodiments described herein.

Many customer-facing systems work with the same data and could benefit from a common format for that data as they work with it for various purposes such as troubleshooting, alerts, and so forth. Providing a common schema may simplify editing rules, content transforms or messages as those data elements can be easily re-used. Furthermore, consistency and ease in authoring is promoted when, e.g., a developer knows that a desired fact is available, in a certain format, named properly, and easily transformed for a particular use case. In addition, in some embodiments, a common schema may permit easy re-use of existing customer and device data without requiring, e.g., json or xml transforms to be re-written for each new data definition.

The following is a non-limiting example of one suitable common schema:

```
{
  "$schema": "http://json-schema.org/draft-04/schema#",
  "title": "Fact",
  "description": "A 2.0 Fact",
  "javaType": "com.co.alerts.schemas.pojos.shared.newfacts.Fact",
  "type": "object",
  "properties": {
    "key": {
      "type": "string",
      "description": "the name of the fact, for example 'customerinfo_rateplan' or 'customer_order_orderstatus'"
    },
```

-continued

```
    "type": {
      "type": "string",
      "enum": [
        "fact",
        "event"
      ],
      "description": "Whether this is a unique fact (something we know about this customer right now, like rate plan), or whether it's an event, like an order being created, rate plan change, etc."
    },
    "value": {
      "description": "The fact or event data."
    },
    "timestamp": {
      "type": "string",
      "format": "date-time",
      "description": "Time of the event or when the fact was known. If not provided the current time of posting may be used."
    },
    "source": {
      "type": "string",
      "description": "The source system name as a string."
    },
    "expires": {
      "type": "string",
      "format": "date-time",
      "description": "Hard expiry date for the fact or event to be expunged from the cache."
    },
    "subfacts": {
      "type": "object",
      "javaType": "java.util.Map<java.lang.String, java.lang.Object>",
      "description": "Map of subfacts. Subfacts are key value pairs that relate to a primary fact."
    }
  },
  "required": [
    "key",
    "type",
    "value",
    "source"
  ],
  "additionalProperties": false
}
```

In accordance with one or more of the embodiments described herein, a card engine may dynamically configure content for display via a user interface associated with user equipment. In cooperation with a facts controller to provide facts that the card engine may access substantively in real time and a rules engine to provide constructs in the form of card definitions, the card engine may evaluate cards using the facts obtained from the facts controller. The resulting cards may be formatted for display via the user interface and transmitted to the UE accordingly. In this way, the card engine may make content decisions proximate to events occurring to the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A server, comprising:
one or more processors;
facts storage operatively coupled to the one or more processors; and memory to maintain one or more components executable by the one or more processors, the one or more components comprising:
a card engine configured to:
collect content into thematic groups;
create a hierarchical container tree of containers that represent logical groupings of cards according to the thematic groups;
retrieve facts from the facts storage related to usage of user equipment,
evaluate card definitions in accordance with the retrieved facts to generate cards that represent content presentations on user equipment,
generate container definitions for the containers,
resolve the container definitions in accordance with the generated cards,
receive a request for a card, and
format one of the generated cards for presentation via the user equipment.

2. The server of claim 1, wherein the card engine is configured to:
send fact requests to obtain the facts from the facts storage.

3. The server of claim 1, wherein the card engine is configured to:
receive pushed fact updates from the facts storage.

4. The server of claim 3, wherein the pushed fact updates dynamically change one or more of the cards.

5. The server of claim 1, wherein the card engine is configured to:
arrange the cards in one of the containers below the top level of the container tree for advancement up the container tree according to a card rank; and
advance a highest-ranked card of the arranged cards up the container tree;
wherein the formatted card is the highest-ranked card at the top level of the container tree.

6. The server of claim 5,
wherein the card definitions include one or more variants having respective weights;
wherein the arranged cards have respective weights that are based on the weights of variants included in the cards; and
wherein the highest-ranked card has the highest weight among the arranged cards.

7. The server of claim 6, wherein the card engine is configured to:
receive pushed fact updates from the facts storage;
wherein the pushed fact updates include changes to the weight of at least one of the arranged cards.

8. One or more non-transitory computer-readable media on which are stored computer-executable instructions which, if executed by a computing device, cause the computing device to perform operations comprising:
collecting content into thematic groups;
creating a hierarchical container tree of containers that represent logical groupings of cards according to the thematic groups;
obtaining facts related to usage of user equipment;
generating cards that represent content presentations on user equipment in accordance with the obtained facts, wherein at least some of the containers represent logical groupings of the generated cards;
receiving a request for a card; and
formatting one of the generated cards for presentation via the user equipment.

9. The one or more non-transitory computer-readable media of claim 8, wherein the operations further comprise:
sending fact requests to obtain the facts.

10. The one or more non-transitory computer-readable media of claim 8, wherein the operations further comprise:
receiving pushed updates to the obtained facts.

11. The one or more non-transitory computer-readable media of claim 10, wherein the pushed updates dynamically change one or more of the cards.

12. The one or more non-transitory computer-readable media of claim 8,
wherein the cards include one or more variants having respective weights;
wherein the cards have respective weights that are based on the weights of the variants included in the respective cards;
wherein the operations comprise:
arranging the cards in one of the containers below the top level of the container tree according to the respective weights of the cards, and
advancing a highest-weighted card of the arranged cards up the container tree; and
wherein the formatted card is the highest-weighted card at the top level of the container tree.

13. The one or more non-transitory computer-readable media of claim 12, wherein the operations comprise:
receiving pushed fact updates;
wherein the pushed fact updates include changes to the weight of at least one of the arranged cards.

14. The one or more non-transitory computer-readable media of claim 8, wherein the facts include unique facts that are user-specific and non-unique facts that are user-nonspecific.

15. A method to provide content formatted for display, comprising:
generating containers;
collecting content into thematic groups;
creating a hierarchical container tree of containers that represent logical groupings of cards according to the thematic groups;
receiving card definitions;
obtaining facts related to usage of user equipment,
evaluating the card definitions in accordance with the obtained facts to generate cards that represent content presentations on user equipment,
resolving the container definitions in accordance with the generated cards;
formatting one of the generated cards for presentation via the user equipment.

16. The method of claim 15, wherein the resolving of the container definitions comprises:
arranging the cards in one of the containers below the top level of the container tree according to respective weights assigned to the cards;
determining whether any of the respective weights assigned to the cards in the one of the containers changed;
in response to determining that at least one of the respective weights assigned to the cards in the one of the containers changed, rearranging the cards in the one of the containers; and
in response to determining that the respective weights assigned to the cards in the one of the containers are unchanged, advancing a highest-weighted card of the arranged cards up the container tree.

17. The method of claim 16,
wherein the card definitions include one or more variants having respective weights; and
wherein the respective weights of the arranged cards are based on the weights of variants included in the respective cards.

18. The method of claim 17, comprising:
receiving pushed fact updates;
wherein the pushed fact updates include changes to the weight of at least one of the arranged cards.

19. The method of claim 17, comprising:
receiving pushed fact updates;
wherein the pushed fact updates include changes to the weight of at least one of the variants.

20. The method of claim 15, wherein the facts include unique facts that are user-specific and non-unique facts that are user-nonspecific.

* * * * *